(12) United States Patent
Manolakos et al.

(10) Patent No.: US 12,313,760 B2
(45) Date of Patent: May 27, 2025

(54) RELATIVE LOCATION REPORTING FOR UE BASED POSITIONING

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 17/469,768

(22) Filed: Sep. 8, 2021

(65) Prior Publication Data
US 2022/0091221 A1 Mar. 24, 2022

Related U.S. Application Data

(60) Provisional application No. 63/080,441, filed on Sep. 18, 2020.

(51) Int. Cl.
*H04W 4/16* (2009.01)
*G01S 5/02* (2010.01)
(Continued)

(52) U.S. Cl.
CPC ........... *G01S 5/0284* (2013.01); *H04W 4/029* (2018.02); *H04W 64/003* (2013.01)

(58) Field of Classification Search
CPC ....... H04W 4/02; H04W 4/029; H04W 64/00; H04W 84/042
(Continued)

(56) References Cited

U.S. PATENT DOCUMENTS

| 2010/0141483 | A1 | 6/2010 | Thacher et al. |
| 2012/0072110 | A1* | 3/2012 | Venkatraman ......... G01C 21/08 701/434 |

(Continued)

FOREIGN PATENT DOCUMENTS

| EP | 3425875 A1 | 1/2019 |
| EP | 3684085 A1 | 7/2020 |

(Continued)

OTHER PUBLICATIONS

International Search Report and Written Opinion—PCT/US2021/049634—ISA/EPO—Feb. 18, 2022.
Taiwan Search Report—TW110133649—TIPO—Jan. 14, 2025.

*Primary Examiner* — Joseph Arevalo
(74) *Attorney, Agent, or Firm* — QUALCOMM Incorporated

(57) ABSTRACT

A user equipment (UE) reports its own position using reference location information messages and relative location information messages. An example method performed by a first UE includes determining a first location of the first UE based on positioning measurements, transmitting a reference location information message indicating the first location, determining one or more subsequent locations of the first UE based on subsequent positioning measurements, and transmitting one or more relative location information messages, each of the one or more relative location information messages indicating a subsequent location for the UE based on relative information with respect to the first location.

32 Claims, 13 Drawing Sheets

(51) Int. Cl.
*H04W 4/029* (2018.01)
*H04W 64/00* (2009.01)

(58) Field of Classification Search
USPC ...... 455/456.1, 456.3, 458, 312, 434, 404.2, 455/466, 414.2
See application file for complete search history.

(56) References Cited

U.S. PATENT DOCUMENTS

| | | | |
|---|---|---|---|
| 2017/0371349 A1* | 12/2017 | Kim | G08G 1/096775 |
| 2018/0206100 A1* | 7/2018 | Eisner | H04W 12/02 |
| 2020/0092693 A1* | 3/2020 | Zhang | G08G 1/0112 |
| 2020/0137509 A1* | 4/2020 | Stanek | H04S 7/304 |
| 2020/0166945 A1* | 5/2020 | Kim | B60W 50/00 |
| 2022/0317236 A1* | 10/2022 | Dongare | G01S 1/024 |

FOREIGN PATENT DOCUMENTS

| | | |
|---|---|---|
| TW | 202027544 A | 7/2020 |
| WO | WO-2019032010 A1 | 2/2019 |

\* cited by examiner

RELATIVE LOCATION REPORTING FOR UE BASED POSITIONING

CLAIM OF PRIORITY UNDER 35 U.S.C. § 119

This application claims under 35 USC § 119 the benefit of and priority to U.S. Provisional Application No. 63/080,441, filed Sep. 18, 2020, entitled "RELATIVE LOCATION REPORTING FOR UE BASED POSITIONING," which is assigned to the assignee hereof and is incorporated herein by reference in its entirety.

BACKGROUND

Field

Subject matter disclosed herein relates to estimation of a location of a mobile device and more particularly to a mobile device estimating and reporting its own location to one or more other devices in a network.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). Assistance data is sent to a mobile device to assist in acquiring and measuring signals and/or in computing a location estimate from the measurements, which may be useful for acquiring PRS for location determination. A mobile device acquiring PRSs may compute an estimate of its own location using various positioning methods and report the estimated location to one or more other devices in the network, such as to one or more base stations, location servers, network entities, o other mobile devices. For example, a mobile device may receive assistance data including location information for one or more transmission/reception points (TRPs), and the mobile device may exchange signals with the one or more TRPs and determine its own position based the exchanges signals and the known location of the one or more TRPs. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

Because of limitations in power, spectrum, processing, and other resources in wireless networks, reducing the amount of information, such as reducing the number of bits to be transmitted in connection with the reporting of the location of a mobile device is to be desired.

SUMMARY

A user equipment (UE) reports its own position using reference location information messages and relative location information messages. An example method performed by a first UE includes determining a first location of the first UE based on positioning measurements, transmitting a reference location information message indicating the first location, determining one or more subsequent locations of the first UE based on subsequent positioning measurements, and transmitting one or more relative location information messages, each of the one or more relative location information messages indicating a subsequent location for the first UE based on relative information with respect to the first location.

In some implementations, the method may further include determining a configuration for the reference location information messages and the relative location information messages, where the configuration includes one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for transmitting the reference location information messages, and a relative periodicity for transmitting the relative location information messages. In some aspects, the method may further include determining, based at least in part on the reference periodicity, a second location of the first UE based on positioning measurements, transmitting, based at least in part on the reference periodicity, a second reference location information message indicating the second location, determining, based at least in part on the relative periodicity, one or more subsequent locations of the first UE based on subsequent positioning measurements, and transmitting, based at least in part on the relative periodicity, one or more second relative location information messages, each of the one or more relative location information messages indicating respective subsequent locations for the first UE with respect to the second location.

In some aspects, the configuration for the location information messages is determined at least in part based on one or more messages received from a network entity comprising a location information function (LMF), or a location server, or a second UE in the wireless network. In some aspects, determining the configuration includes receiving a message from the network entity specifying the configuration. In some other aspects, determining the configuration includes receiving one or more messages from the network entity indicating two or more supported configurations and selecting one of the two or more supported configurations.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, first a user equipment (UE) configured to support positioning of the UE in a wireless network, including a wireless transceiver configured to wirelessly communicate with entities in the wireless network; at least one memory; at least one processor coupled to the wireless transceiver and the at least one memory, wherein the at least one processor is configured to determine a first location of the first UE based on positioning measurements, transmit a reference location information message indicating the first location, determine one or more subsequent locations of the first UE based on subsequent positioning measurements, and transmit one or more relative location information messages, each of the one or more relative location information messages indicating a subsequent location for the first UE based on relative information with respect to the first location.

In one implementation, a method for supporting positioning of a first user equipment (UE) in a wireless network performed by a location server in the wireless network, including receiving a reference location information message from a first UE over a channel of a wireless network, determining a first reference location of the first UE based at least in part on the received reference location information message, receiving one or more relative location information messages from the first UE over the channel of the wireless network, and determining one or more relative locations of the first UE with respect to the first reference location based at least in part on relative information in the one or more relative location information messages.

In some implementations, the method may further include determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the method may further include receiving, based at least in part on the reference periodicity, a second reference location information message, determining, based on the second reference location information message, a second reference location of the first UE, receiving, based at least in part on the relative periodicity, one or more second relative location information messages; and determining, based on relative information in the one or more second relative location information messages, one or more corresponding subsequent locations for the first UE with respect to the second location.

In some aspects, the method further includes transmitting one or more messages to the first UE specifying the configuration. In some aspects, the method further includes transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, a location server configured to support positioning of a first user equipment (UE) in a wireless network, including an external interface configured to communicate with entities in the wireless network; at least one memory; at least one processor coupled to the external interface and the at least one memory, wherein the at least one processor is configured to receive a reference location information message from a first UE over a channel of a wireless network, determine a first reference location of the first UE based at least in part on the received reference location information message, receive one or more relative location information messages from the first UE over the channel of the wireless network, and determine one or more relative locations of the first UE with respect to the first reference location based at least in part on relative information in the one or more relative location information messages.

In one implementation, a method for supporting positioning of a first user equipment (UE) in a wireless network performed by a serving base station for the first UE in the wireless network, including receiving a reference location information message from a first UE over a channel of a wireless network, determining a first reference location of the first UE based at least in part on the received reference location information message, receiving one or more relative location information messages from the first UE over the channel of the wireless network, and determining one or more relative locations of the first UE with respect to the first reference location based at least in part on relative information in the one or more relative location information messages.

In some implementations, the method may further include determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the method may further include receiving, based at least in part on the reference periodicity, a second reference location information message, determining, based on the second reference location information message, a second reference location of the first UE, receiving, based at least in part on the relative periodicity, one or more second relative location information messages; and determining, based on relative information in the one or more second relative location information messages, one or more corresponding subsequent locations for the first UE with respect to the second location.

In some aspects, the method further includes transmitting one or more messages to the first UE specifying the configuration. In some aspects, the method further includes transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, a base station configured to support positioning of a first user equipment (UE) in a wireless network, including an external interface configured to wirelessly communicate with entities in the wireless network; at least one memory; at least one processor coupled to the external interface and the at least one memory, wherein the at least one processor is configured to receive a reference location information message from a first UE over a channel of a wireless network, determine a first reference location of the first UE based at least in part on the received reference location information message, receive one or more relative location information messages from the first UE over the channel of the wireless network, and determine one or more relative locations of the first UE with respect to the first reference location based at least in part on relative information in the one or more relative location information messages.

In one implementation, a first user equipment (UE) reports its own position using reference location information messages and relative location information messages. An example first UE includes means for determining a first location of the first UE based on positioning measurements, means for transmitting a reference location information message indicating the first location, means for determining one or more subsequent locations of the first UE based on subsequent positioning measurements, and means for transmitting one or more relative location information messages, each of the one or more relative location information messages indicating a subsequent location for the first UE based on relative information with respect to the first location.

In some implementations, the first UE may further include means for determining a configuration for the reference location information messages and the relative location information messages, where the configuration includes one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for transmitting the reference location information messages, and a relative periodicity for transmitting the relative location information messages. In some aspects, the first UE may further include means for determining, based at least in part on the reference periodicity, a second location of the first UE based on positioning measurements, means for transmitting, based at least in part on the reference periodicity, a second reference location information message indicating the second location, means for determining, based at least in part on the relative periodicity, one or more subsequent locations of the first UE based on subsequent positioning measurements, and means for transmitting, based at least in part on the relative periodicity, one or more second relative location information messages, each of the one or more relative location information messages indicating respective subsequent locations for the UE with respect to the second location.

In some aspects, the configuration for the location information messages is determined at least in part based on one or more messages received from a network entity comprising a location information function (LMF), or a location server, or a second UE in the wireless network. In some aspects, determining the configuration includes receiving a message from the network entity specifying the configuration. In some other aspects, determining the configuration includes receiving one or more messages from the network entity indicating two or more supported configurations and selecting one of the two or more supported configurations.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, a location server supports positioning of a first user equipment (UE) in a wireless network. An example location server includes means for receiving a reference location information message from the first UE over a channel of a wireless network, means for determining a first reference location of the first UE based at least in part on the received reference location information message, means for receiving one or more relative location information messages from the first UE over the channel of the wireless network, and means for determining one or more relative locations of the first UE with respect to the first reference location based at least in part on relative information in the one or more relative location information messages.

In some implementations, the location server may further include means for determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the location server may further include means for receiving, based at least in part on the reference periodicity, a second reference location information message, means for determining, based on the second reference location information message, a second reference location of the first UE, means for receiving, based at least in part on the relative periodicity, one or more second relative location information messages; and means for determining, based on relative information in the one or more second relative location information messages, one or more corresponding subsequent locations for the first UE with respect to the second location.

In some aspects, the location server further includes means for transmitting one or more messages to the first UE specifying the configuration. In some aspects, the location server further includes means for transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, a base station supports positioning of a first user equipment (UE) in a wireless network. An example base station includes means for receiving a reference location information message from the first UE over a channel of a wireless network, means for determining a first reference location of the first UE based at least in part on the received reference location information message, means for receiving one or more relative location information messages from the first UE over the channel of the wireless network, and means for determining one or more relative locations of the first UE with respect to the first reference location based at least in part on relative information in the one or more relative location information messages.

In some implementations, the base station may further include means for determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the base station may further include means for receiving, based at least in part on the reference periodicity, a second reference location information message, means for determining, based on the second reference location information message, a second reference location of the first UE, means for receiving, based at least in part on the relative periodicity, one or more second relative location information messages; and means for determining, based on relative information in the one or more second relative location information messages, one or more corresponding subsequent locations for the first UE with respect to the second location.

In some aspects, the base station further includes means for transmitting one or more messages to the first UE specifying the configuration. In some aspects, the base station further includes means for transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

In one implementation, a non-transitory computer readable storage medium stores instructions for execution by one or more processors of a first user equipment (UE). Execution of the instructions causes the first UE to report its own position using reference location information messages and relative location information messages by performing operations including determining a first location of the first UE based on positioning measurements, transmitting a reference location information message indicating the first location, determining one or more subsequent locations of the first UE based on subsequent positioning measurements, and transmitting one or more relative location information messages, each of the one or more relative location information messages indicating a subsequent location for the first UE based on relative information with respect to the first location.

In one implementation, a non-transitory computer readable storage medium stores instructions for execution by one or more processors of a location server. Execution of the instructions causes the location server to support positioning of a first user equipment (UE) in a wireless network by performing operations including receiving a reference location information message from the first UE over a channel of a wireless network, determining a first reference location of the first UE based at least in part on the received reference location information message, receiving one or more relative location information messages from the first UE over the channel of the wireless network, and determining one or more relative locations of the first UE with respect to the first reference location based at least in part on relative information in the one or more relative location information messages.

In one implementation, a non-transitory computer readable storage medium stores instructions for execution by one or more processors of a base station. Execution of the instructions causes the base station to support positioning of a first user equipment (UE) in a wireless network by performing operations including receiving a reference location information message from the first UE over a channel of a wireless network, determining a first reference location of the first UE based at least in part on the received reference location information message, receiving one or more relative location information messages from the first UE over the channel of the wireless network, and determining one or more relative locations of the first UE with respect to the first reference location based at least in part on relative information in the one or more relative location information messages.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
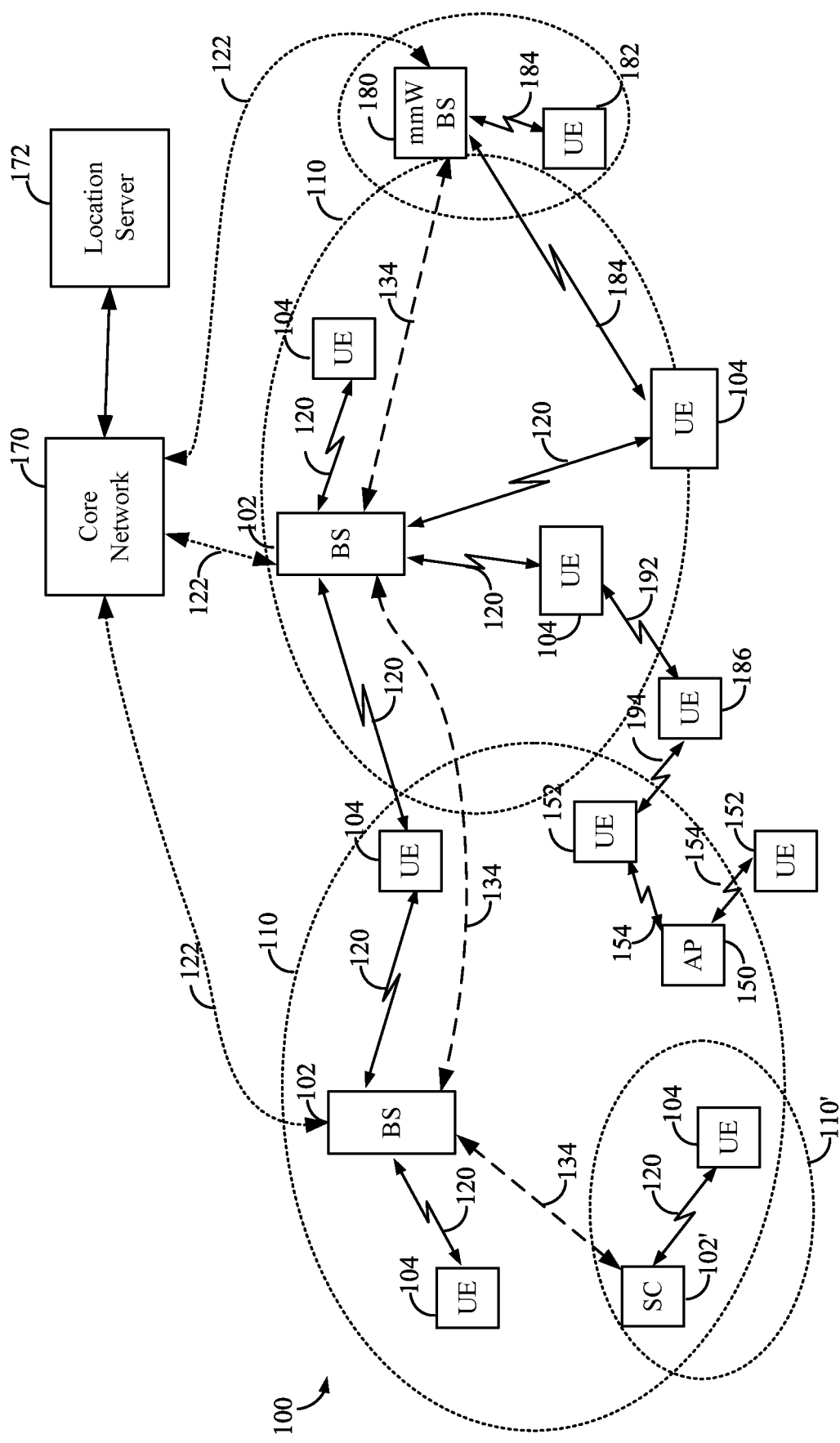
FIG. 1A illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, a consumer asset tracking device, a consumer wearable (e.g., smartwatch, glasses, augmented reality (AR)/virtual reality (VR) headset, etc.), a navigation device for a vehicle (e.g., automobile, motorcycle, bicycle, etc.), devices and appliances connected to the internet as a part of the Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or transmission point or transmission reception point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AOD), Round Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements. For example, the assistance data may provide satellite ephemeris data in the case of GNSS positioning or base station locations and other base station characteristics such as PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA-TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires one or more dedicated positioning signals transmitted by base stations, referred to as Positioning Reference Signals (PRS), which are used to generate the desired measurements for the supported positioning technique. Positioning Reference Signals (PRS) are defined for 5G NR positioning to enable UEs to detect and measure more neighbour base stations or Transmission/Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AOD, Multi-RTT |
| Rel.16 DL PRS/Rel.16 SRS for positioning | UE Rx-Tx time difference | Multi-RTT |
| Rel. 15 SSB/ CSI-RS for RRM | SS-RSRP (RSRP for RRM), SS-RSRQ (for RRM), CSI-RSRP (for RRM), CSI-RSRQ (for RRM) | E-CID |

FIG. 1A illustrates an exemplary wireless communications system 100. The wireless communications system 100 (which may also be referred to as a wireless wide area network (WWAN)) may include various network nodes, including base stations and UEs. The base stations 102, sometimes referred to as TRPs 102, may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 186, that connects indirectly to one or more communication networks via one or more device-to-device (D2D) peer-to-peer (P2P) links. In the example of FIG. 1A, UE 186 has a D2D P2P link 192 with one of the UEs 104 connected to one of the base stations 102 (e.g., through which UE 186 may indirectly obtain cellular connectivity) and a D2D P2P link 194 with WLAN STA 152 connected to the WLAN AP 150 (through which UE 186 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 180 over a mmW communication link 184. For example, the macro cell base station 102 may support a PCell and one or more SCells for the UE 104 and the mmW base station 180 may support one or more SCells for the UE 104.

Figure 1B:
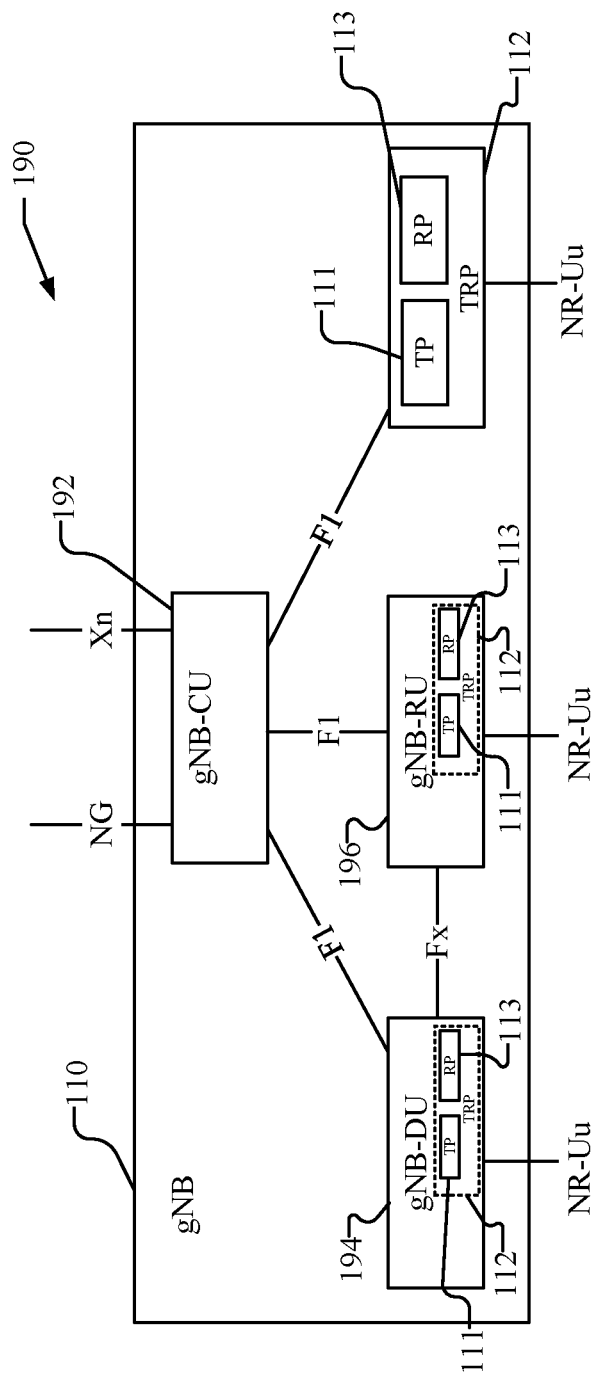
FIG. 1B shows an architecture diagram of an NG-RAN node that includes a gNB Central Unit, a gNB Distributed Unit, and gNB Remote Unit.

FIG. 1B shows an architecture diagram of an NG-RAN node 190 that may be within an NG-RAN in FIG. 1A, e.g., as a separate entity or as part of another gNB. The NG-RAN node 190 may be a gNB 102, according to one implementation. The architecture shown in FIG. 1B, for example, may be applicable to any gNB 102 in FIG. 1A.

As illustrated, gNB 102 may include a gNB Central Unit (gNB-CU) 192, a gNB Distributed Unit (gNB-DU) 194, a gNB Remote Unit (gNB-RU) 196, which may be physically co-located in the gNB 102 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 102 via an Xn interface. The gNB-DU 194 is a logical or physical node hosting support for Radio Link Control (RLC), Medium Access Control (MAC) and Physical (PHY) protocol layers used over the NR Uu air interface of the gNB 102, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 1B, gNB 102 may include a Transmission Point (TP) 111 and a Reception Point (RP) 113 combined into a Transmission Reception Point (TRP) 112, which may be physically or logically located in the gNB 102. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 102) may comprise a subset of the elements shown in FIG. 1B. For example, the NG-RAN node 190 may comprise the gNB-CU 192 but may not include one or more of gNB-DU 194 and gNB-RU 196, RP 113 or TP 111. Alternatively, NG-RAN node 190 may include one or more of gNB-DU 194 and, RP 113 or TP 111 but may not include gNB-RU 196. Further, the elements shown in FIG. 1B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 102, may use XnAP or a protocol above XnAP, such as an extended NR Positioning Protocol A (NRPPa) as defined in 3GPP TS 38.455. The location procedures between NG-RAN node 190 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

Figure 2A:
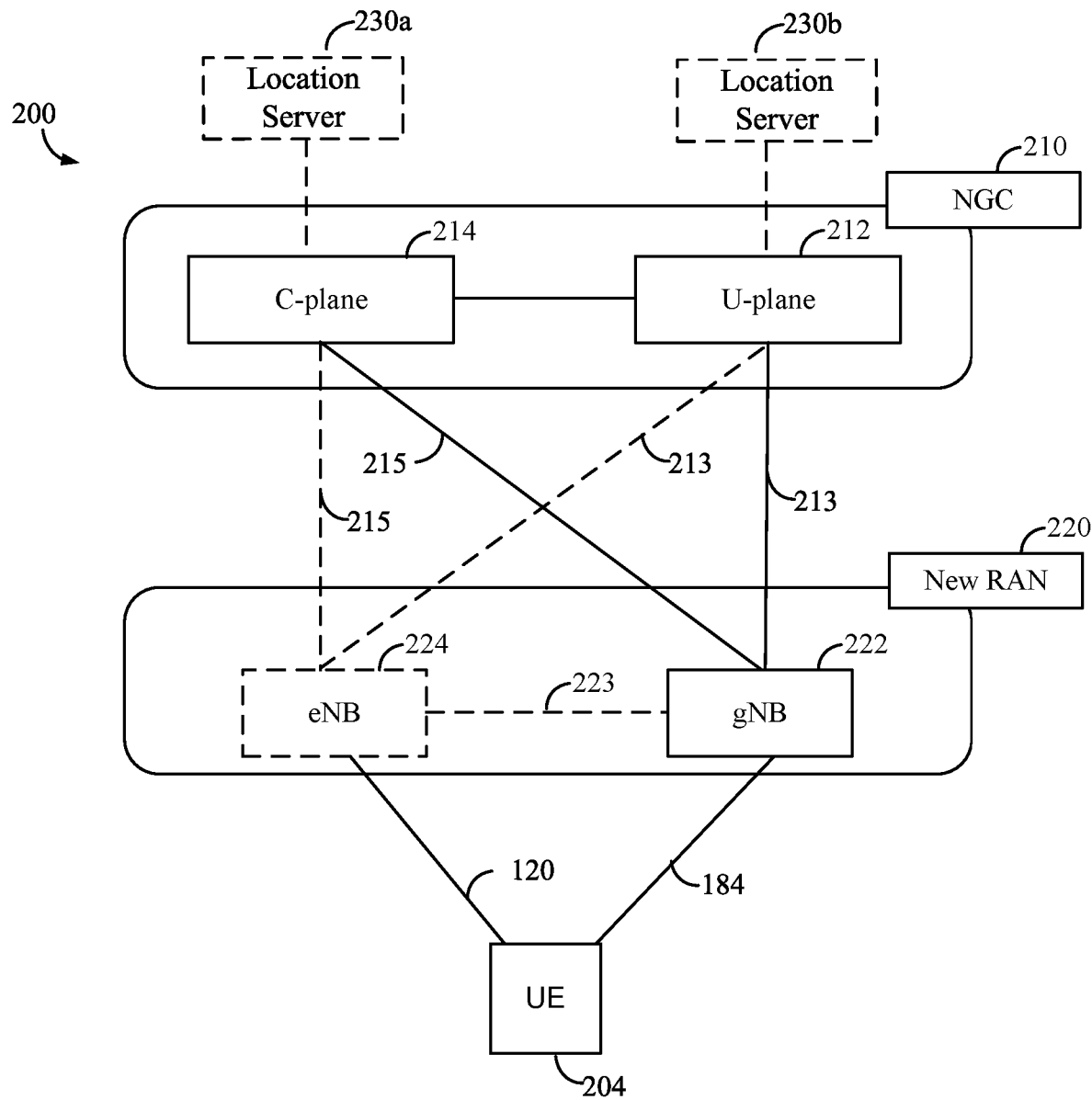
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
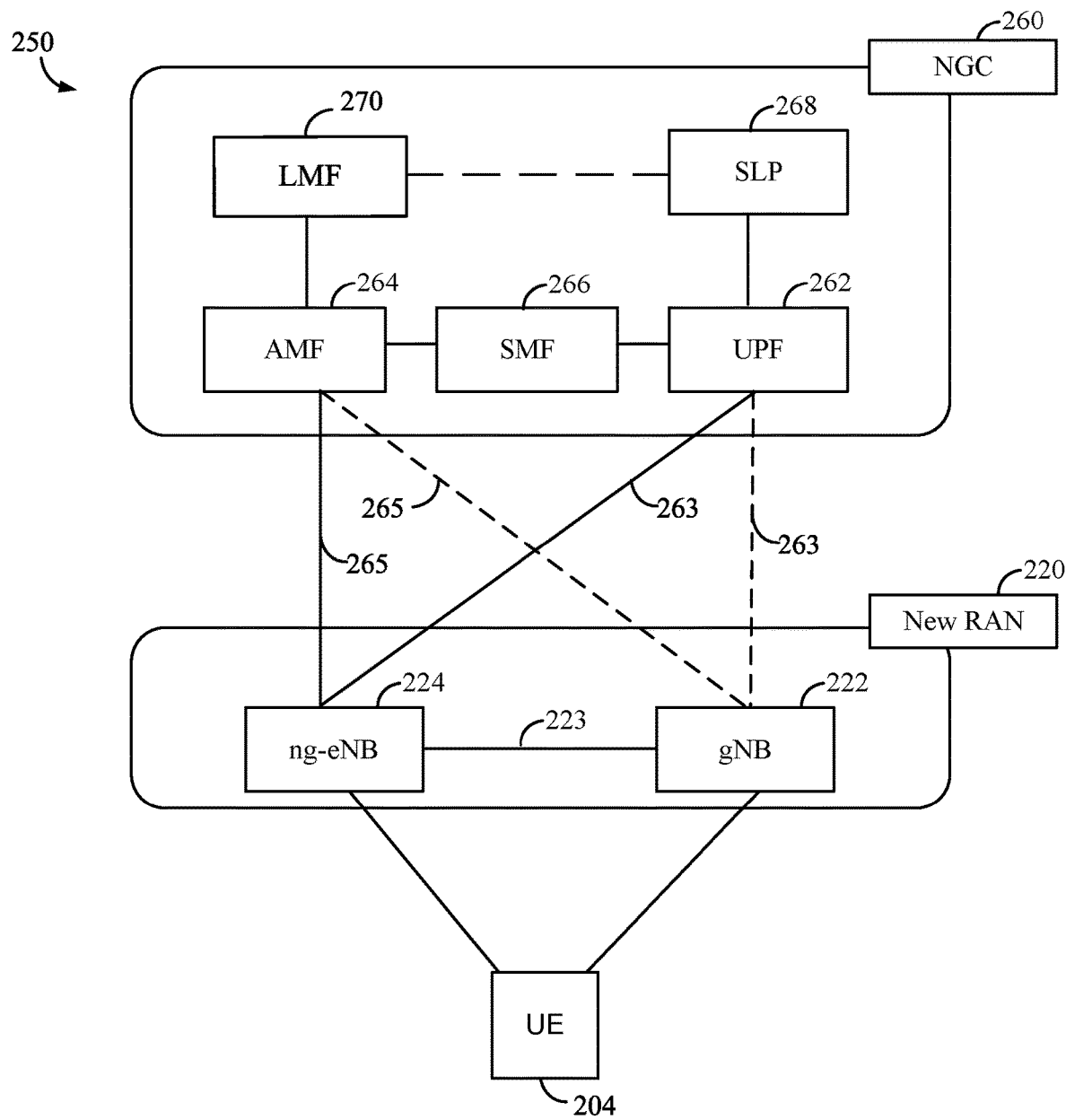

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1A). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
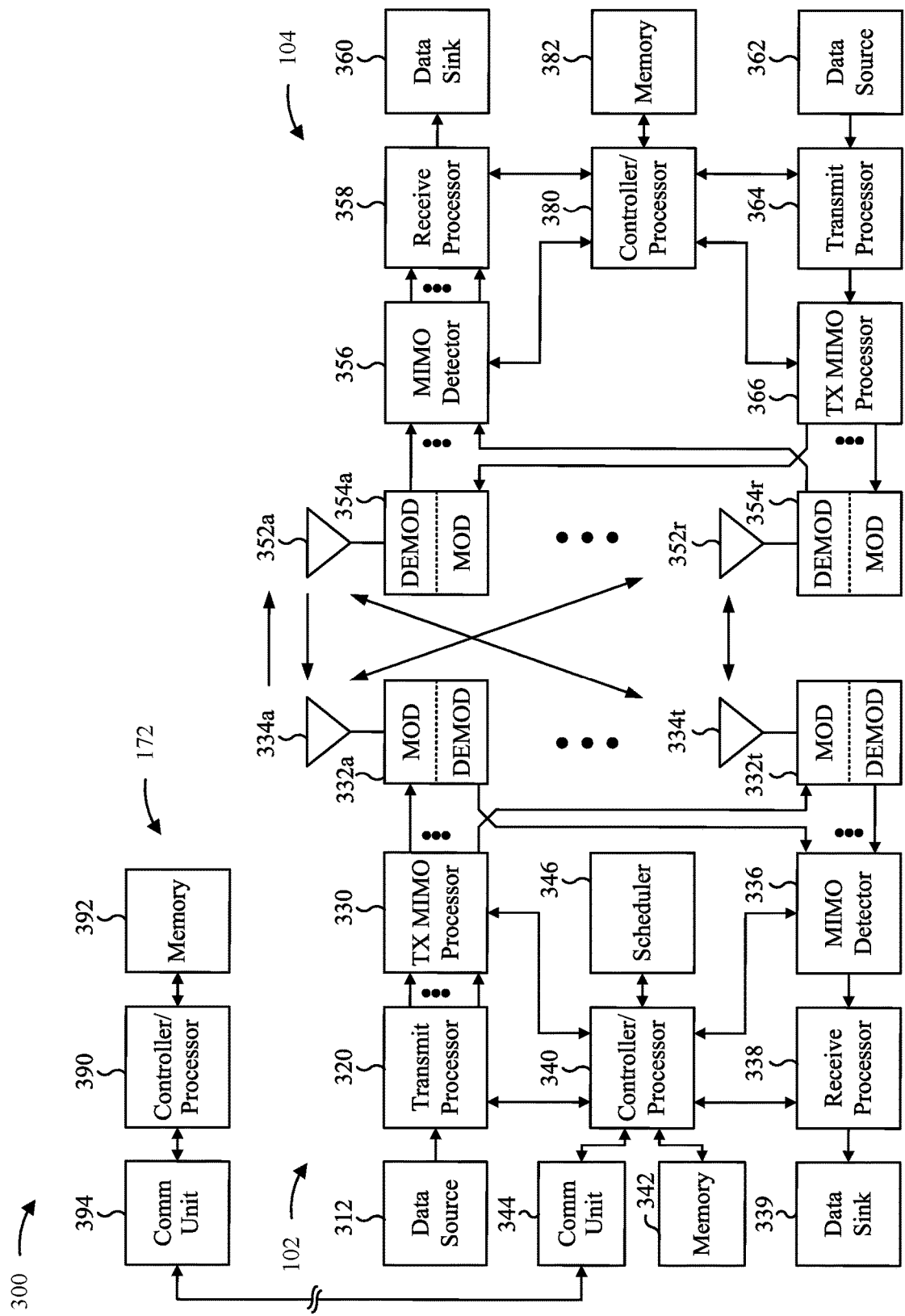
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1A. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 172 via communication unit 344. Location server 172 may include communication unit 394, controller/processor 390, and memory 392.

Controller/processor 340 of base station 102, controller/processor 380 of UE 104, controller/processor 390 of location server 172, and/or any other component(s) of FIG. 3 may perform one or more techniques supporting positioning of the UE using relative location information messages, as described in more detail elsewhere herein. For example, controller/processor 380 of UE 104, controller/processor 390 of location server 172, controller/processor 340 of base station 102, and/or any other component(s) of FIG. 3 may perform or direct operations of, for example, process 900, 1000, and 1100 of FIGS. 9, 10, and 11, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of the UE 104, location server 172, and/or base station 102, may perform or direct operations of, for example, process 900, 1000, and 1100 of FIGS. 9, 10, and 11 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
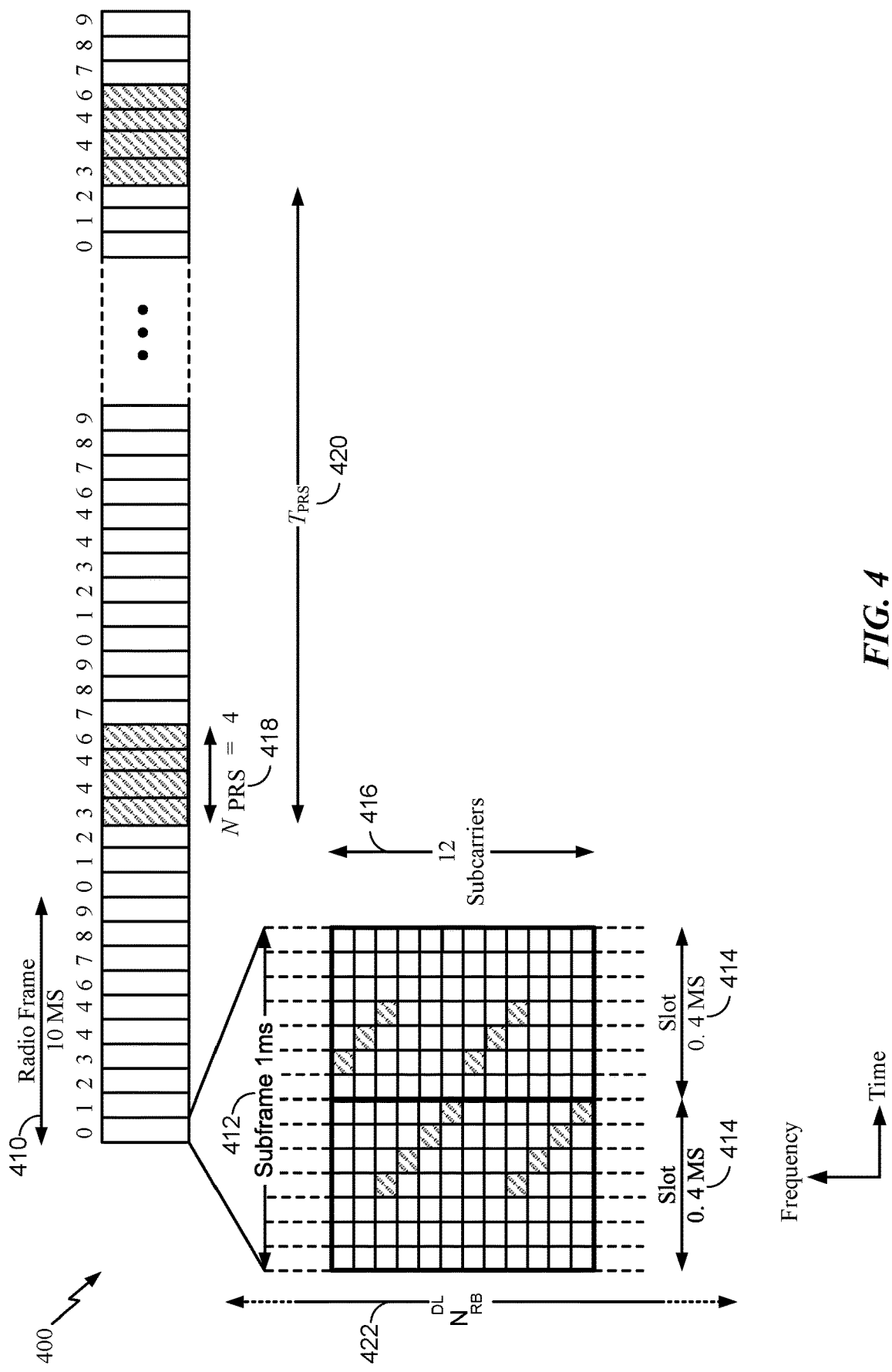
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that is intended for positioning. Downlink (DL) or sidelink (SL) signals for which the primary purpose is unrelated to positioning, such as control or communication, are referred to herein as non-positioning reference signals (non-PRS). Examples of non-PRS include, but are not limited to, PHY channels, such as SSB, TRS, CSI-RS, PDSCH, DM-RS, PDCCH, PSSCH, and PSCCH.

As discussed above, in some UE based positioning modes, a UE may receive assistance data and determine a location estimate based at least in part on the resulting location measurements. For example, a location management function (LMF) may configure the UE with a PRS resources ID for measurements, may provide location information for one or more TRPs, may provide satellite ephemeris data in the case of GPS or GNSS, and so on. In some other UE based positioning modes the UE may make location related measurements without any positioning assistance data from a location server and may further compute a location or a change in location without any positioning assistance. Recent 3GPP releases allow for a UE to report its position fix in a variety of manners, such as a single position fix, as well as periodically, or when triggered by one or more events. Periodic position may be used in cases of UE tracking, for example. When multiple position fixes are to be reported by a UE within a short period of time, it would be desirable to conserve spectral and timing resources by reducing the number of bits required for the UE to report its position.

Accordingly, aspects of the example implementations allow for reduction of the number of bits required for a UE to report its position to one or more devices in a wireless network by allowing the UE to report its location only periodically, and to replace a portion of the location reports with reports of the UE's location relative to a previously reported location. For example, a UE may transmit a reference location report message, indicating that the UE is estimated to be at a first location, and subsequently transmit one or more relative location report messages, indicating the UE's location relative to the first location. Configuring a portion of the location reports to include relative location information rather than the UE's full location may allow a substantial reduction in the number of bits required for the UE to transmit its location, particularly when performing periodic position fixes or frequent event triggered position fixes.

In some aspects, a UE may perform a first location determination, determining a first location of the UE. For example, the location determination may be based on information in one or more assistance messages received via a location server, another UE, a base station, and so on, or the UE may determine its own location independently of such assistance information, for example using GPS or GNSS. The determined first location may be referred to as a "reference location," as it is the location that subsequent relative locations are to be reported in reference to. The UE may then report reference location information to one or more other network devices, such as the location server, UE, base station, etc., for example in a measurement report message as one or more information elements (IEs), such as one or more common IEs included in CommonIEsProvideLocationInformation. For example, the reference location information may include a latitude, longitude, and altitude, Cartesian coordinates, information specifying a polygon, or another suitable plurality of location coordinates indicating the reference location. The resolution, or granularity, with which the location coordinates may differ for one or more of the coordinates. For example, when the location coordinates includes a latitude, longitude, and altitude, in some aspects the altitude may be reported using a coarser granularity than the latitude and longitude. The reference location information may further include one or more uncertainties in the reference location information, such as an uncertainty circle, an uncertainty ellipse, an uncertainty ellipsoid, and so on.

In some implementations, the UE may report the reference location information similarly to the format in which an LMF reports a reference TRP location to a UE. For example, an LMF may provide NR-PositionCalculationAssistance-r16 to the UE per ETSI TS 37.355, indicating a Reference-Point-r16 specifying a reference location. This reference location may be specified using any of a number of location coordinate types, such as Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, EllipsoidArc, HighAccuracyEllipsoidPointWithUncertaintyEllipse, and HighAccuracyEllipsoidPointWithAltitudeAndUncertaintyEllipsoid. According to some aspects of the present disclosure, the UE may report the reference location information similarly.

Subsequent to reporting the reference location information, the UE may perform a second location determination, determining a second location of the UE with respect to the reference location. Such location information may be referred to as relative location information. The UE may report this relative information to the one or more network devices in one or more UEs, such as one or more common IEs included in CommonIEsProvideLocationInformation. The relative location information may indicate a difference between the first location and the second location of the UE, such as a difference in each of the plurality of location coordinates, such as a difference in each of a latitude, a longitude, and an altitude, a difference in Cartesian coordinates, and so on. The relative location information may further indicate one or more uncertainties in the relative location information, such as an uncertainty circle, an uncertainty ellipse, an uncertainty ellipsoid, and so on.

In some implementations, the UE may report the relative location information similarly to the format in which an LMF reports relative TRP locations to a UE. For example, an LMF may provide NR-PositionCalculationAssistance-r16 to the UE per ETSI TS 37.355, indicating a Reference-Point-r16 specifying a reference location of a first TRP, and RelativeLocation-r16 indicating locations of one or more other TRPs relative to the reference location, such as Delta-Latitude-r16, Delta-Longitude-r16, DeltaHeight-r16, and so on. This relative location may be specified using any of a number of location coordinate types, such as Ellipsoid-Point, Ellipsoid-PointWithUncertaintyCircle, EllipsoidPointWithUncertaintyEllipse, EllipsoidPointWithAltitude, EllipsoidPointWithAltitudeAndUncertaintyEllipsoid, EllipsoidArc, HighAccuracyEllipsoidPointWithUncertaintyEllipse, and HighAccuracyEllipsoidPointWithAltitudeAndUncertaintyEllipsoid. According to some aspects of the present disclosure, the UE may report the relative location information similarly, however, the UE need not include information indicating the reference location, as the reference location information has already been reported in previous reference location information.

Further, when reported similarly to the format in which an LMF reports relative TRP locations to a UE, the UE's reported relative information may further include information about units and scaling factors for the reported relative information, for example in the RelativeLocation-r16 field. More particularly, the RelativeLocation-r16 field may indicate that the relative latitude and longitude are reported in a specified one of a plurality of units and scaling factors. For example, the RelativeLocation-r16 field may include a milli-arc-second-units field specifying that the delta-latitude and delta-longitude fields are reported as scaled by any one of 0.03, 0.3, 3, or 30 milliarcseconds. Further, the RelativeLocation-r16 field may include a height-units field indicating that the delta-height are reported in a specified one of a plurality of units and scaling factors, such as in units of millimeters, centimeters, or meters. Note that other scaling factors are possible for the latitude, longitude, and height without departing from the scope of this disclosure. The RelativeLocation-r16 field may further include the Delta-Latitude-r16 field indicating the relative latitude with respect to the reference location. For example, the Delta-Latitude-r16 field may include a delta-Latitude value indicating the relative latitude as scaled by the unit indicated by the milli-arc-second-units field. The Delta-Latitude-r16 field may further include a coarse-delta-Latitude field which indicates the relative latitude at a much coarser scale, for example as scaled multiple orders of magnitude more coarsely than the unit indicated in the milli-arc-second-units field. In one example the coarse-delta-Latitude field specifies the relative longitude scaled by 1024 times the size of the unit in the milli-arc-second-field-units field. The RelativeLocation-r16 field may further include the Delta-Longitude-r16 field indicating the relative longitude with respect to the reference location. For example, the Delta-Longitude-r16 field may include a delta-Longitude value indicating the relative longitude as scaled by the unit indicated by the milli-arc-second-units field. The Delta-Longitude-r16 field may further include a coarse-delta-Longitude field which indicates the relative longitude at a much coarser scale, for example as scaled multiple orders of magnitude more coarsely than the unit indicated in the milli-arc-second-units field. In one example the coarse-delta-Longitude field specifies the relative longitude scaled by 1024 times the size of the unit in the milli-arc-second-field-units field.

When reported similarly to the format in which an LMF reports relative TRP locations to a UE, the UE's reported relative information may further include information about units and scaling factors for the reported relative height and for location uncertainty, for example in respective delta-height-r16 and locationUNC fields. For example the delta-height-r16 field may include delta-Height, specifying the relative height as a multiple of the unit provided in the height-units field. The Delta-Height-r16 field may further include a coarse-delta-Height field specifying the relative height at a much coarser scale, such as scaled multiple orders of magnitude more coarsely than the unit indicated in the height-units field, such as 1024 times the size of the unit in the height-units field. The locationUNC field may indicate uncertainties for the relative information. In one example, the locationUNC field may include a horizontalUncertainty value indicating the horizontal uncertainty of the relative latitude and longitude. This horizontal uncertainty may correspond to the encoded high accuracy uncertainty as defined in TS 23.032. The locationUNC field may further include a vertical uncertainty of the relative height, which may correspond to the encoded high accuracy uncertainty as defined in TS 23.032. In some aspects, if the locationUNC field is absent, the absence may indicate that the uncertainty is the same as for the associated reference location.

In some aspects, the relative location information includes fewer bits than required for the reference location information, allowing for location reporting to consume fewer network resources, such as airtime and spectral resources. In some examples, the relative location information may contain significantly fewer bits than the reference location information. For example, when the reference location information and relative location information are reported similarly to NR-PositionCalculationAssistance-r16, the reduction in required bits may vary between 28%, for EllipsoidPointWithUncertaintyEllipse, and 45%, for Ellipsoid-Point, and may vary between the two depending on the chosen location coordinate type.

In some aspects, the UE may determine and report reference and relative location information periodically. For example, the UE may be configured to report location information at a specified periodicity, and according to a specified reference-relative ratio. In some aspects, the periodicity may indicate a specified time between each report of location information. In some other aspects, the periodicity may indicate a reference periodicity indicating a time period between subsequent reports of reference location information, and a relative periodicity indicating a time period between subsequent reports of relative location information. The reference-relative ratio may specify a first portion of the location reports which include reference location information, and a second portion of the location reports which include relative location information. In one example, the UE may be configured to report relative location information four times between reports of reference location information, that is, a reference-relative ratio of 1:4. Note that this ratio is only one or many reference-relative ratios which may be used for reporting the location information.

Figure 5:
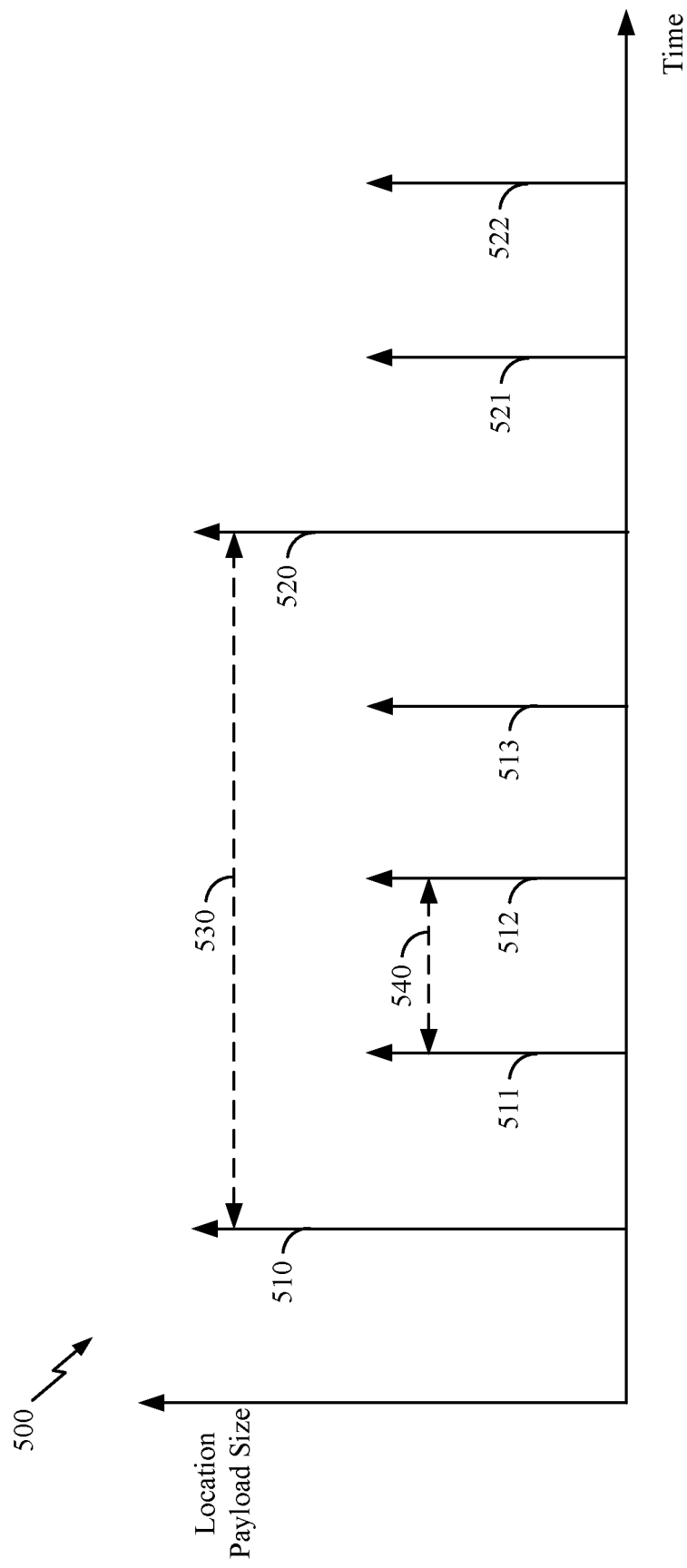
FIG. 5 shows an example time diagram, showing reports of reference and relative location information by a UE, according to some implementations

FIG. 5 shows an example time diagram 500, showing reports of reference and relative location information by a UE, according to some implementations. With respect to FIG. 5, the UE may report a first reference location in location information message 510, and a second reference location in location information message 520. In other words, the reference location information may be reported with a reference periodicity 530. The UE may report first relative location information messages 511, 512, and 513, indicating location information relative to the first reference location, and may subsequently report second relative location information messages 521 and 522, indicating location information relative to the second reference location. Thus, the relative location information messages are transmitted with a relative periodicity 540, and a reference-relative ratio of 1:3. As discussed above, the relative location information messages 511, 512, 513, 521, and 522 have a location payload size substantially less than that of reference location information messages 510 and 520.

In some aspects, the reduced payload size of the relative location information messages may allow the UE to report the relative location information through lower layer signaling, which may result in improved latency. For example, the relative location information messages may be included in media access control (MAC) control elements (MAC CE), uplink control information (UCI), sidelink control information (SCI) messages, and so on. In some aspects, the reference location information messages may also be transmitted via the lower layer signaling, while in some other aspects, the reference location information messages may be transmitted via higher layer signaling such as via a radio resource control (RRC) protocol or LTE positioning protocol (LPP).

In some aspects, a UE may independently determine the configuration for its location reporting. Such a configuration may include one or more of the format for the location information messages, such as the location coordinates and uncertainty to be used, the periodicity for transmitting the reference and relative location information, and the reference-relative ratio, as discussed above. In some other aspects, the UE may determine the configuration based on one or more messages received from a network entity, such as a location server, LMF, base station, or another UE. In some aspects, the one or more messages may specify the configuration the UE is to use. In some other aspects, the one or more messages may indicate two or more available or recommended configurations, and the UE may select from the indicated configurations. For example, the one or more messages may indicate two or more formats, periodicities, or reference-relative ratios which may be used, and the UE may select one format, periodicity, or reference-relative ratio from those indicated.

Figure 6:
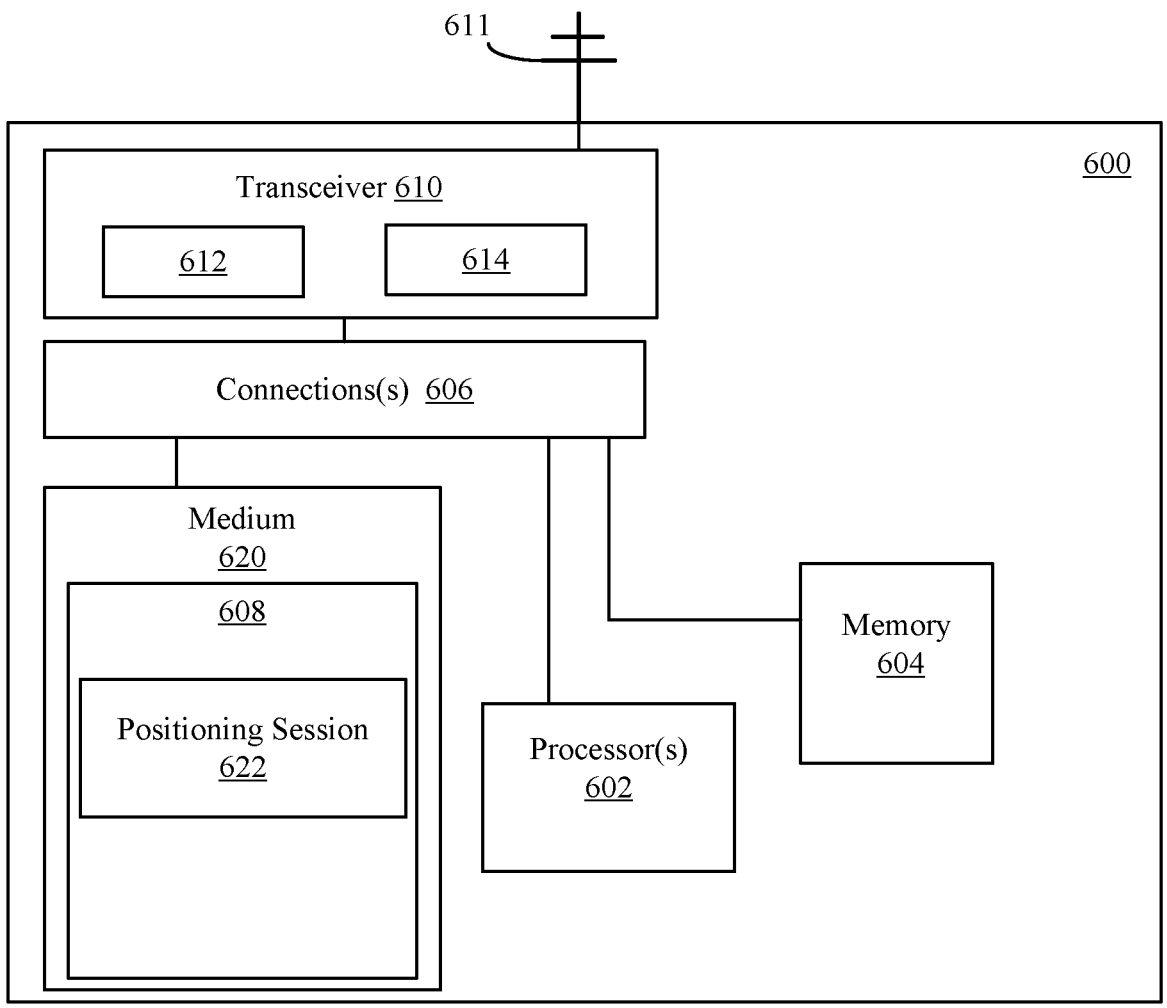
FIG. 6 shows a schematic block diagram illustrating certain exemplary features of a UE, e.g., which may be UE 104 shown in FIG. 1A, enabled to support positioning of the UE using relative location information messages.

FIG. 6 shows a schematic block diagram illustrating certain exemplary features of a UE 600, e.g., which may be UE 104 shown in FIG. 1A, enabled to support positioning of the UE using relative location information messages, as described herein. The UE 600 may perform the process flow shown in FIG. 9. UE 600 may, for example, include one or more processors 602, memory 604, an external interface such as a transceiver 610 (e.g., wireless network interface), which may be operatively coupled with one or more connections 606 (e.g., buses, lines, fibers, links, etc.) to non-transitory computer readable medium 620 and memory 604. The UE 600 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 600 may take the form of a chipset, and/or the like. Transceiver 610 may, for example, include a transmitter 612 enabled to transmit one or more signals over one or more types of wireless communication networks and a receiver 614 to receive one or more signals transmitted over the one or more types of wireless communication networks.

In some embodiments, UE 600 may include antenna 611, which may be internal or external. UE antenna 611 may be used to transmit and/or receive signals processed by transceiver 610. In some embodiments, UE antenna 611 may be coupled to transceiver 610. In some embodiments, measurements of signals received (transmitted) by UE 600 may be performed at the point of connection of the UE antenna 611 and transceiver 610. For example, the measurement point of reference for received (transmitted) RF signal measurements may be an input (output) terminal of the receiver 614 (transmitter 612) and an output (input) terminal of the UE antenna 611. In a UE 600 with multiple UE antennas 611 or antenna arrays, the antenna connector may be viewed as a virtual point representing the aggregate output (input) of multiple UE antennas. In some embodiments, UE 600 may determine one or more reference or relative locations based on the processing of received signals by the one or more processors 602 and may transmit location information messages including such reference or relative location information using the output terminal of the transmitter 612.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors. A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a positioning session module 622 that when implemented by the one or more processors 602 configures the one or more processors 602 to engage in a positioning session for the UE. For example, the one or more processors 602 may be configured to engage in a positioning session by providing positioning capabilities to a location server, via the transceiver 610. The one or more processors 602 may be configured to receive positioning assistance data from a location server and/or serving base station, via the transceiver 610. The one or more processors 602 may be configured to perform positioning measurements, e.g., determining reference location information and relative location information, using the transceiver 610. The one or more processors 602 may further be configured to provide location information reports, via the transceiver 610, to a network node, such as location server, serving base station or a sidelink UE.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support positioning of the UE based on reference location information and relative location information in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by one or more processors 602 may be operatively enabled to perform all or portions of the example operations as described herein. Computer readable medium 620 may be a part of memory 604.

Figure 7:
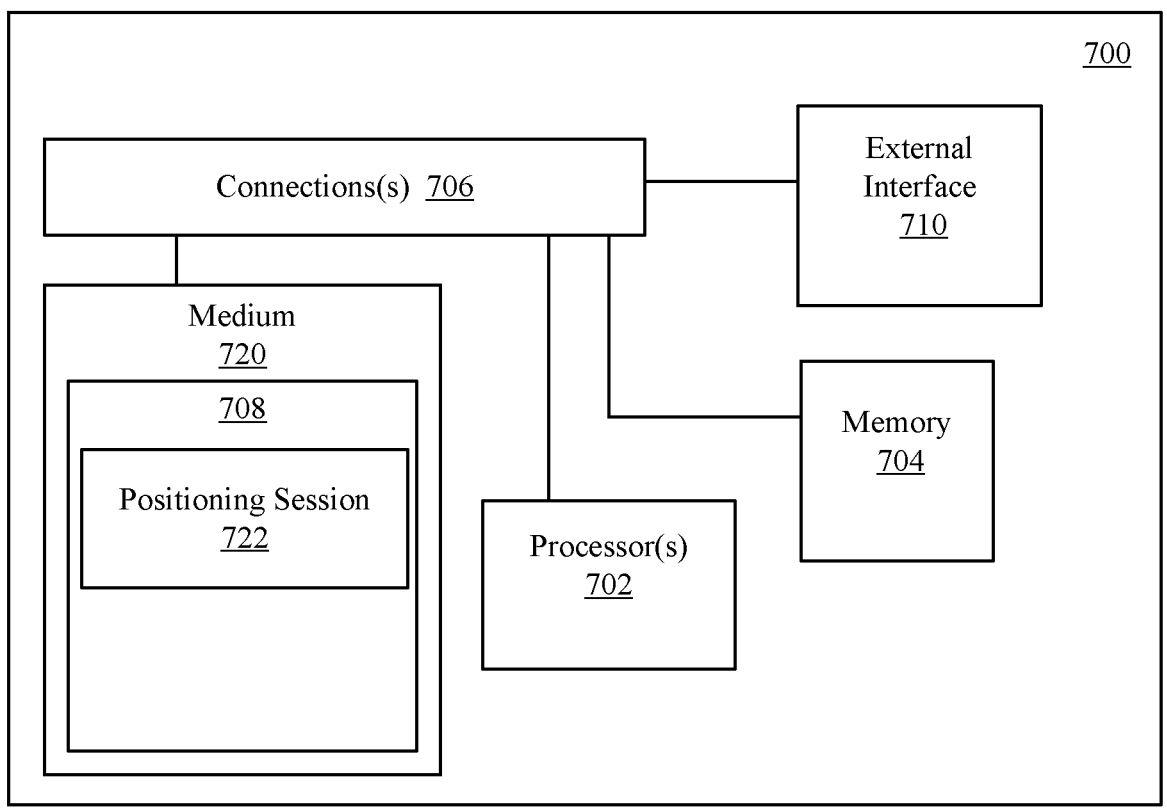
FIG. 7 shows a schematic block diagram illustrating certain exemplary features of a location server enabled to support positioning of the UE using relative location information messages.

FIG. 7 shows a schematic block diagram illustrating certain exemplary features of a location server 700, e.g., location server 172, enabled to support positioning of the UE using relative location information messages, as described herein. The location server 700 may be, e.g., an E-SMLC or LMF. The location server 700 may perform the process flow shown in FIG. 10. Location server 700 may, for example, include one or more processors 702, memory 704, and an external interface 710 (e.g., wireline or wireless network interface to other network entities, such as core network entities and base stations), which may be operatively coupled with one or more connections 706 (e.g., buses, lines, fibers, links, etc.) to non-transitory computer readable medium 720 and memory 704. The location server 700 may further include additional items, which are not shown, such as a user interface that may include e.g., a display, a keypad or other input device, such as virtual keypad on the display, through which a user may interface with the location server. In certain example implementations, all or part of location server 700 may take the form of a chipset, and/or the like. The external interface 710 may be a wired or wireless interface capable of connecting to base stations in the RAN or network entities, such as an AMF or MME.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of location server 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in location server 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors. A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in location server 700 is merely exemplary, and as such the functionality of the modules and/or data structures may be combined, separated, and/or be structured in different ways depending upon the implementation of the location server 700.

The medium 720 and/or memory 704 may include a positioning session module 722 that when implemented by the one or more processors 1102 configures the one or more processors 702 to engage in a positioning session for the UE. For example, the one or more processors 702 may be configured to engage in a positioning session by requesting and receive positioning capabilities from a UE, via the external interface 710. The one or more processors 702 may be configured to generate and send positioning assistance data to the UE and/or serving base station, via the external interface 710. The one or more processors 702 may further be configured to receive location information messages including reference location information and relative location information, via the external interface 710, from the UE. The one or more processors 702 may further be configured to determine a position location for the UE based on the reference location information and the relative location information included in the location information messages.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support positioning of the UE using reference and relative location information in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include an external interface 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 1120 that may include computer implementable code 708 stored thereon, which if executed by one or more processors 702 may be operatively enabled to perform all or portions of the example operations as described herein. Computer readable medium 720 may be a part of memory 704.

Figure 8:
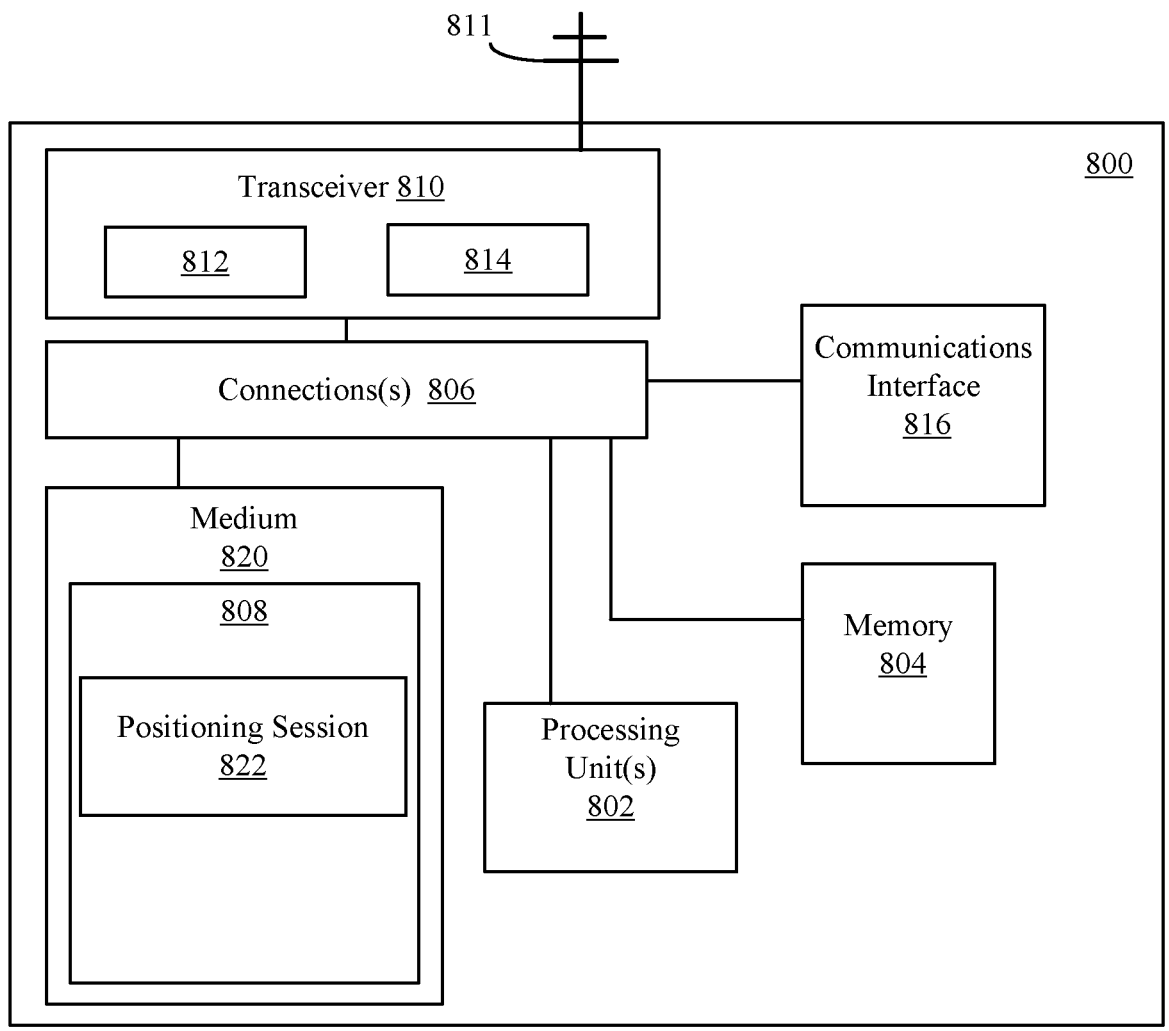
FIG. 8 shows a schematic block diagram illustrating certain exemplary features of a base station enabled to support positioning of the UE using relative location information messages.

FIG. 8 shows a schematic block diagram illustrating certain exemplary features of a base station 800, e.g., base station 102 in FIG. 1A, enabled to support positioning of the UE using relative location information messages, as described herein. The base station 800 may be an eNB or gNB. The base station 800 may perform the process flow shown in FIG. 11. Base station 800 may, for example, include one or more processors 802, memory 804, an external interface, which may include a transceiver 810 (e.g., wireless network interface) and a communications interface 816 (e.g., wireline or wireless network interface to other base stations and/or entities in the core network such as a location server), which may be operatively coupled with one or more connections 806 (e.g., buses, lines, fibers, links, etc.) to non-transitory computer readable medium 820 and memory 804. The base station 800 may further include additional items, which are not shown, such as a user interface that may include e.g., a display, a keypad or other input device, such as virtual keypad on the display, through which a user may interface with the base station. In certain example implementations, all or part of base station 800 may take the form of a chipset, and/or the like. Transceiver 810 may, for example, include a transmitter 812 enabled to transmit one or more signals over one or more types of wireless communication networks and a receiver 814 to receive one or more signals transmitted over the one or more types of wireless communication networks. The communications interface 816 may be a wired or wireless interface capable of connecting to other base stations in the RAN or network entities, such as a location server 172 shown in FIG. 1A.

In some embodiments, base station 800 may include antenna 811, which may be internal or external. Antenna 811 may be used to transmit and/or receive signals processed by transceiver 810. In some embodiments, antenna 811 may be coupled to transceiver 810. In some embodiments, measurements of signals received (transmitted) by base station 800 may be performed at the point of connection of the antenna 811 and transceiver 810. For example, the measurement point of reference for received (transmitted) RF signal measurements may be an input (output) terminal of the receiver 814 (transmitter 812) and an output (input) terminal of the antenna 811. In a base station 800 with multiple antennas 811 or antenna arrays, the antenna connector may be viewed as a virtual point representing the aggregate output (input) of multiple antennas. In some embodiments, base station 800 may receive location information messages including such reference or relative location information of a UE using the input terminal of the receiver 814 and determine one or more reference or relative locations of the UE based on processing of the received location information signals by the one or more processors 802.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of base station 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in base station 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors. A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in base station 800 is merely exemplary, and as such the functionality of the modules and/or data structures may be combined, separated, and/or be structured in different ways depending upon the implementation of the base station 800.

The medium 820 and/or memory 804 may include a positioning session module 822 that when implemented by the one or more processors 802 configures the one or more processors 802 to engage in a positioning session for the UE. For example, the one or more processors 802 may be configured transmit and receive messages for the UE 104 and location server 172 to engage in a positioning session. The one or more processors 802 may be configured to receive, e.g., via the transceiver 810, location information messages, and to determine positions of the UE based on the reference location information and relative location information in the received location information messages.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support positioning of the UE using reference location information and relative location information in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
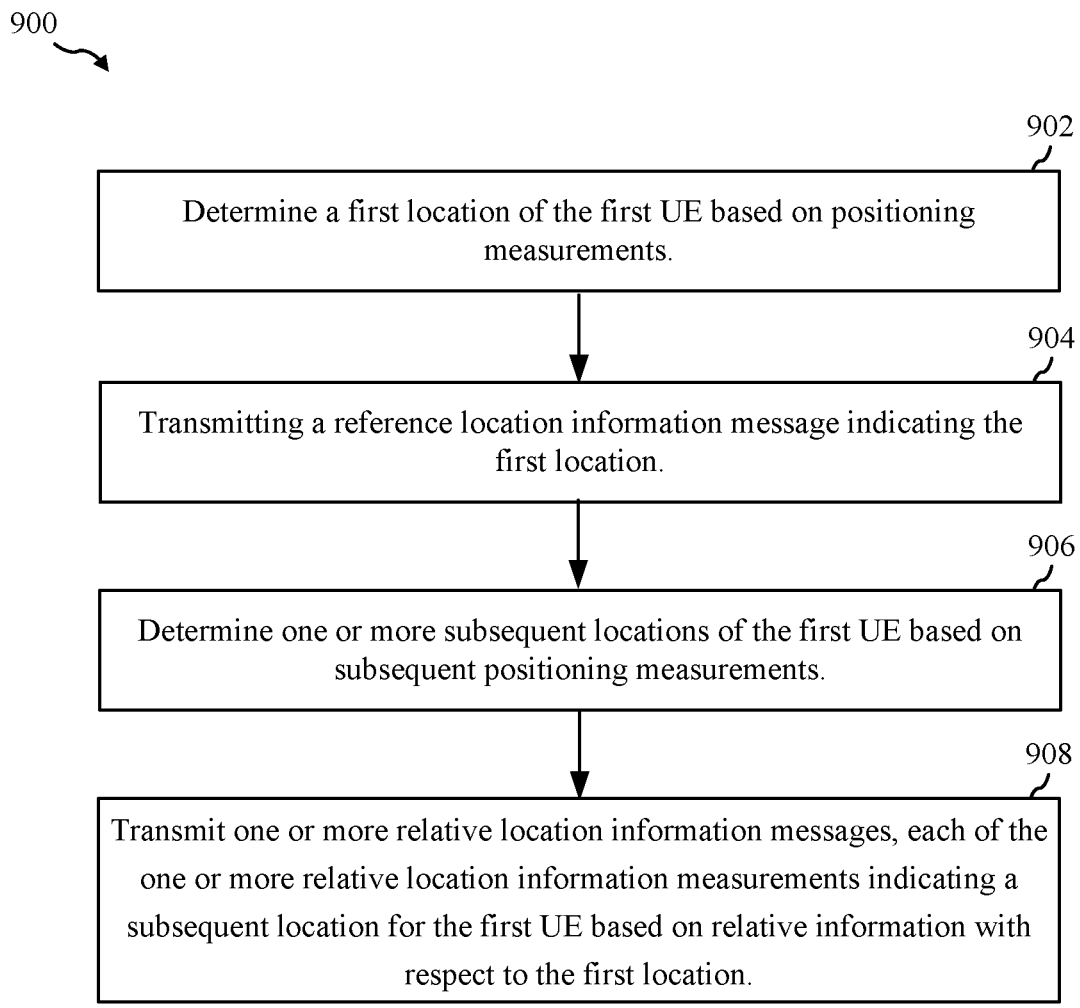
FIG. 9 shows a flowchart for an exemplary method for supporting positioning of a UE in a wireless network performed by the UE.

FIG. 9 shows a flowchart for an exemplary method 900 for supporting positioning of a first user equipment (UE) in a wireless network performed by the first UE, such as UE 104, in a manner consistent with disclosed implementation.

At block 902, the first UE determines a first location of the first UE based on positioning measurements. For example, the position measurements may be determining a position of the first UE with respect to the known positions of one or more TRPs, one or more other UEs, or one or more base stations or other network entities. In some other examples the position measurements may be determined based on one or more satellite measurements such as one or more GPS or GNSS measurements. A means for determining the first location of the first UE may include, with respect to FIG. 6, the positioning session 622 stored on medium 620 or within program code 608 executed by the one or more processors 602 and may be based on signals receive by antenna 611 or the receiver 614.

At block 904, the first UE may transmit a reference location information message indicating the first location. For example, the first UE may transmit the reference location information message to a location server, to a base station, or to another UE. In some aspects the reference location information in the reference location information message may include a set of location coordinates and may optionally include one or more indications of uncertainty in the indicated first location. A means for transmitting a reference location information message indicating the first location may include, with respect to FIG. 6, the positioning session 622 stored on medium 620 or within program code 608 executed by the one or more processors 602 and may be transmitted via the antennas 611 or the transmitter 612.

At block 906, the first UE may determine one or more subsequent locations of the first UE based on subsequent positioning measurements. A means for determining the one or more subsequent locations of the first UE may include, with respect to FIG. 6, the positioning session 622 stored on medium 620 or within program code 608 executed by the one or more processors 602 and may be based on signals receive by antenna 611 or the receiver 614.

At block 908, the first UE may transmit one or more relative location information messages, where each relative location information message indicates a subsequent location for the first UE based on relative information with respect to the first location. In some implementations, the relative information may include a difference in location coordinates between the first location of the first UE and a corresponding one of the one or more subsequent locations. The location coordinates may include a latitude, a longitude, and an altitude, or may include Cartesian coordinates. A means for transmitting the one or more relative location information messages may include, with respect to FIG. 6, the positioning session 622 stored on medium 620 or within program code 608 executed by the one or more processors 602 and may be transmitted via the antennas 611 or the transmitter 612.

In some implementations, the method 900 may further include determining a configuration for the reference location information messages and the relative location information messages, where the configuration includes one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for transmitting the reference location information messages, and a relative periodicity for transmitting the relative location information messages. In some aspects, the method 900 may further include determining, based at least in part on the reference periodicity, a second location of the first UE based on positioning measurements, transmitting, based at least in part on the reference periodicity, a second reference location information message indicating the second location, determining, based at least in part on the relative periodicity, one or more subsequent locations of the first UE based on subsequent positioning measurements, and transmitting, based at least in part on the relative periodicity, one or more second relative location information messages, each of the one or more relative location information messages indicating respective subsequent locations for the UE with respect to the second location.

In some aspects, the configuration for the location information messages is determined at least in part based on one or more messages received from a network entity comprising a location information function (LMF), or a location server, or a second UE in the wireless network. In some aspects, determining the configuration includes receiving a message from the network entity specifying the configuration. In some other aspects, determining the configuration includes receiving one or more messages from the network entity indicating two or more supported configurations and selecting one of the two or more supported configurations.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

Figure 10:
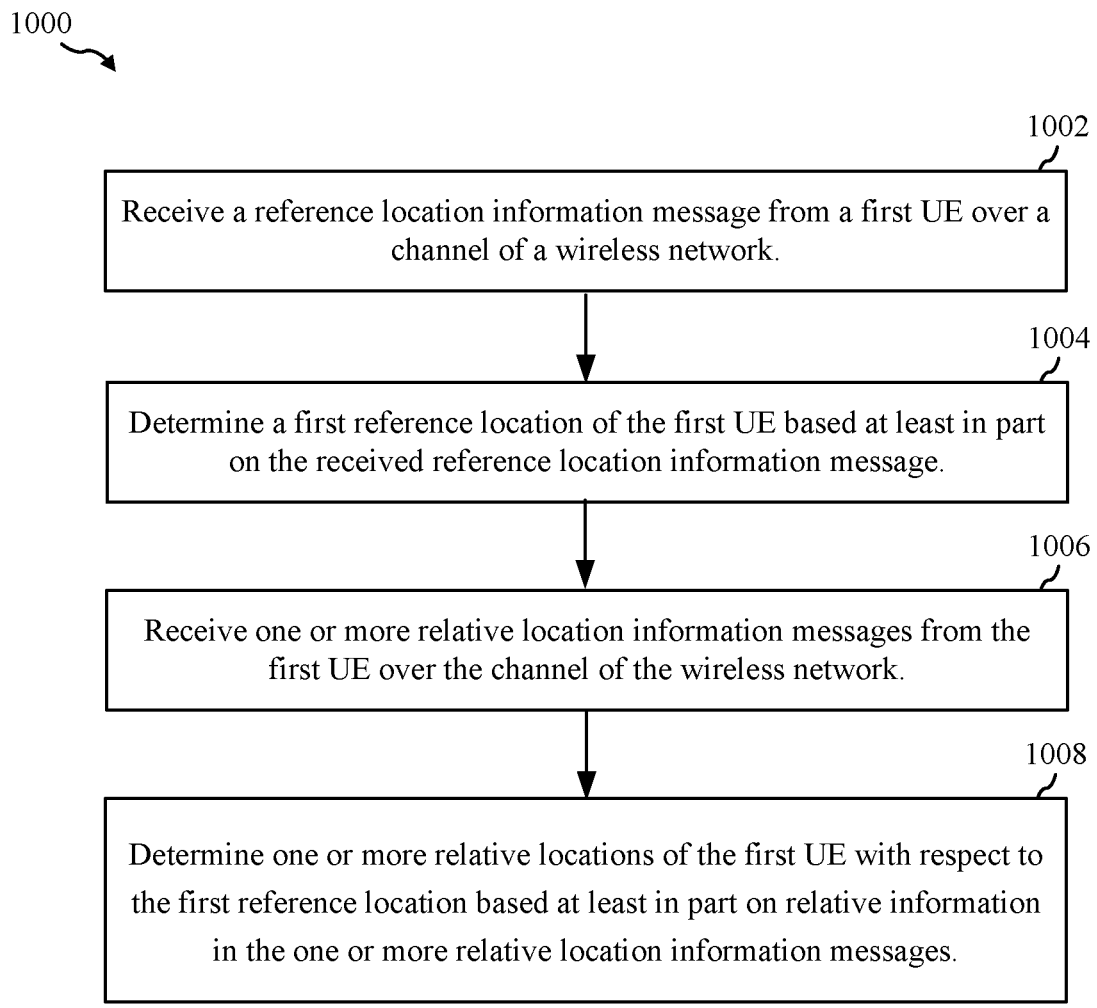
FIG. 10 shows a flowchart for an exemplary method for supporting positioning of a user equipment (UE) in a wireless network performed by a location server in the wireless network.

FIG. 10 shows a flowchart for an exemplary method 1000 for supporting positioning of a user equipment (UE) in a wireless network performed by a location server in the wireless network, such as location server 172, in a manner consistent with disclosed implementation.

At block 1002, the location server may receive a reference location information message from a first UE over a channel of a wireless network. In some aspects, a means for receiving the reference location information message may include, with respect to FIG. 7, positioning session 722 stored on medium 720 or within program code 708 executed by the one or more processors 702, which may receive the reference location information message via the external interface 710 or the connections 706.

At block 1004, the location server may determine a first reference location of the first UE based at least in part on the received reference location information message. A means for determining the first reference location may include, with respect to FIG. 7, positioning session 722 stored on medium 720 or within program code 708 executed by the one or more processors 702.

At block 1006, the location server may receive one or more relative location information messages from the first UE over the channel of the wireless network. A means for receiving the one or more relative location information messages may include, with respect to FIG. 7, positioning session 722 stored on medium 720 or within program code 708 executed by the one or more processors 702, which may receive the reference location information message via the external interface 710 or the connections 706.

At block 1008, the location server may determine one or more relative locations of the first UE with respect to the first reference location based at least in part on relative information in the one or more relative location information messages. A means for determining the one or more relative locations may include, with respect to FIG. 7, positioning session 722 stored on medium 720 or within program code 708 executed by the one or more processors 702.

In some implementations, the method 1000 may further include determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the method 1000 may further include receiving, based at least in part on the reference periodicity, a second reference location information message, determining, based on the second reference location information message, a second reference location of the first UE, receiving, based at least in part on the relative periodicity, one or more second relative location information messages; and determining, based on relative information in the one or more second relative location information messages, one or more corresponding subsequent locations for the UE with respect to the second location.

In some aspects, the method 1000 further includes transmitting one or more messages to the first UE specifying the configuration. In some aspects, the method 1000 further includes transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

Figure 11:
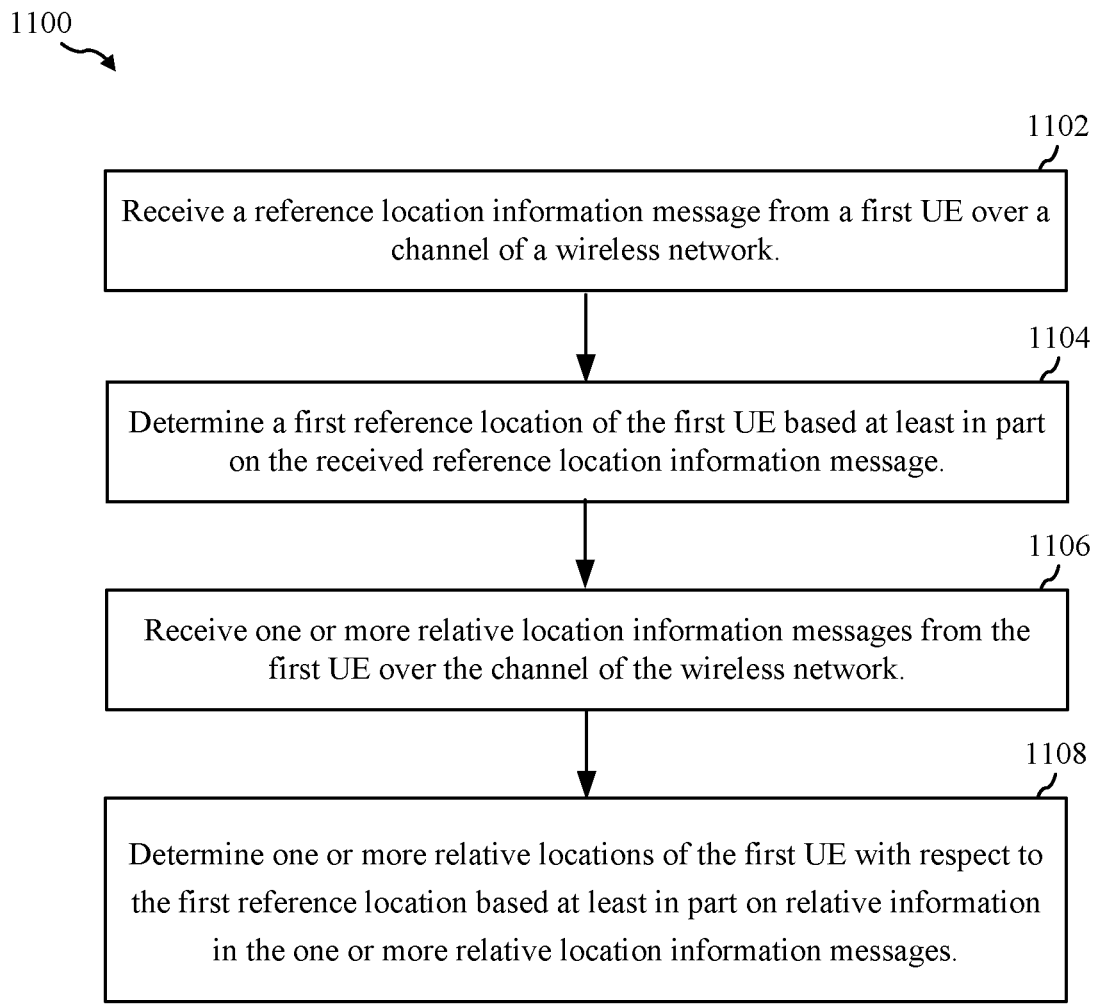
FIG. 11 shows a flowchart for an exemplary method for supporting positioning of a user equipment (UE) in a wireless network performed by a location server in the wireless network.

FIG. 11 shows a flowchart for an exemplary method 1100 for supporting positioning of a user equipment (UE) in a wireless network performed by a serving base station for the UE in the wireless network, such as base station 102 shown in FIG. 1A, in a manner consistent with disclosed implementation.

At block 1102, the base station receives a reference location information message from a first UE over a channel of a wireless network. A means for receiving the reference location information may include, with respect to FIG. 8, the positioning session 822 stored in the medium 820 or in the program code 808 executed by the one or more processing units 802, which may receive the reference location information message via the antenna 811, the transceiver 810 or the receiver 814.

At block 1104, the base station determines a first reference location of the first UE based at least in part on the received reference location information message. A means for determining the first reference location may include, with respect to FIG. 8, the positioning session 822 stored in the medium 820 or in the program code 808 executed by the one or more processing units 802.

At block 1106, the base station receives one or more relative location information messages from the first UE over the channel of the wireless network. A means for receiving the one or more relative location information messages may include, with respect to FIG. 8, the positioning session 822 stored in the medium 820 or in the program code 808 executed by the one or more processing units 802, which may receive the reference location information message via the antenna 811, the transceiver 810 or the receiver 814.

At block 1108, the base station determines one or more relative locations of the first UE with respect to the first reference location based at least in part on relative information in the one or more relative location information messages. A means for determining the one or more relative locations may include, with respect to FIG. 8, the positioning session 822 stored in the medium 820 or in the program code 808 executed by the one or more processing units 802.

In some implementations, the method 1100 may further include determining a configuration for the reference location information messages and the relative location information messages, where the configuration includes one or more of a format for the reference location information messages and relative location information messages, a periodicity for receiving the reference location information messages and relative location information messages, and an indication of a reference-relative ratio, the reference-relative ratio indicating a first proportion of the reference location information messages and a second proportion of the relative location information messages. In some aspects, the format may indicate a granularity for reporting each of the location coordinates in the relative information messages, where at least one of the location coordinates has a granularity differing from a granularity of another of the location coordinates. In some aspects, the periodicity includes a reference periodicity for receiving the reference location information messages, and a relative periodicity for receiving the relative location information messages. In some aspects, the method 1100 may further include receiving, based at least in part on the reference periodicity, a second reference location information message, determining, based on the second reference location information message, a second reference location of the first UE, receiving, based at least in part on the relative periodicity, one or more second relative location information messages; and determining, based on relative information in the one or more second relative location information messages, one or more corresponding subsequent locations for the UE with respect to the second location.

In some aspects, the method 1100 further includes transmitting one or more messages to the first UE specifying the configuration. In some aspects, the method 1100 further includes transmitting one or more messages to the first UE indicating two or more supported configurations, where the determined configuration is one of the two or more supported configurations selected by the first UE.

In some aspects, each of the relative location information messages has a smaller payload size than each reference location information message.

In some aspects, the one or more relative location information messages are each transmitted via lower layer signaling. In some aspects the one or more relative location information messages are includes in media access control (MAC) control elements (MAC CE) or uplink control information (UCI). In some aspects, the one or more relative location information messages are included in one or more sidelink control information (SCI) messages. In some aspects, the reference location information message is transmitted via lower layer signaling. In some aspects, the reference location information message is transmitted via a radio resource control (RRC) protocol or a Long Term Evolution (LTE) positioning protocol (LPP).

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method for transmitting location information messages by a first user equipment (UE) in a wireless network, the method comprising: determining a first location of the first UE based on positioning measurements; transmitting a reference location information message indicating the first location; determining one or more subsequent locations of the first UE based on subsequent positioning measurements; and transmitting one or more relative location information messages, each of the one or more relative location information messages indicating a subsequent location for the first UE based on relative information with respect to the first location.

Clause 2. The method of clause 1, wherein the relative information in each of the one or more relative location information messages comprises a difference in location coordinates between the first location of the first UE and a corresponding one of the one or more subsequent locations.

Clause 3. The method of clause 2, wherein the location coordinates comprise a latitude, a longitude, and an altitude.

Clause 4. The method of any of clauses 2-3, wherein the location coordinates comprise Cartesian coordinates.

Clause 5. The method of any of clauses 2-4, further comprising determining a configuration for the reference location information messages and relative location information messages, the configuration comprising one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages.

Clause 6. The method of clause 5, wherein the format indicates a granularity for reporting each of the location coordinates in the relative location information messages, wherein at least one of the location coordinates has a granularity differing from a granularity of another of the location coordinates.

Clause 7. The method of any of clauses 5-6, wherein the periodicity comprises a reference periodicity for transmitting the reference location information messages and a relative periodicity for transmitting the relative location information messages.

Clause 8. The method of clause 7, further comprising: determining, based at least in part on the reference periodicity, a second location of the first UE based on positioning measurements; transmitting, based at least in part on the reference periodicity, a second reference location information message indicating the second location; determining, based at least in part on the relative periodicity, one or more subsequent locations of the first UE based on subsequent positioning measurements; and transmitting, based at least in part on the relative periodicity, one or more second relative location information messages, each of the one or more relative location information messages indicating respective subsequent locations for the first UE with respect to the second location.

Clause 9. The method of any of clauses 5-8, wherein the configuration for the location information messages is determined at least in part based on one or more messages received from a network entity comprising a location management function (LMF), or a location server, or a second UE in the wireless network.

Clause 10. The method of clause 9, wherein determining the configuration comprises receiving a message from the network entity specifying the configuration.

Clause 11. The method of any of clauses 9-10, wherein determining the configuration comprises receiving one or more messages from the network entity indicating two or more supported configurations and selecting one of the two or more supported configurations.

Clause 12. The method of any of clauses 1-11, wherein each of the relative location information messages has a smaller payload size than each reference location information message.

Clause 13. The method of any of clauses 1-12, wherein the one or more relative location information messages are each transmitted via lower layer signaling.

Clause 14. The method of clause 13, wherein the one or more relative location information messages are included in media access control (MAC) control elements (MAC CE) or uplink control information (UCI).

Clause 15. The method of clause 13, wherein the one or more relative location information messages are included in one or more sidelink control information (SCI) messages.

Clause 16. The method of clause 13, wherein the reference location information message is transmitted via lower layer signaling.

Clause 17. The method of clause 13, wherein the reference location information message is transmitted via higher layer signaling.

Clause 18. The method of clause 17, wherein the reference location information message is transmitted via a radio resource control (RRC) protocol or a Long Term Evolution (LTE) positioning protocol (LPP).

Clause 19. A first user equipment (UE) configured to transmit location information messages in a wireless network, comprising: a wireless transceiver configured to wirelessly communicate with entities in the wireless network; at least one memory; at least one processor coupled to the wireless transceiver and the at least one memory, wherein the at least one processor is configured to: determine a first location of the first UE based on positioning measurements; transmit a reference location information message indicating the first location; determine one or more subsequent locations of the first UE based on subsequent positioning measurements; and transmit one or more relative location information messages, each of the one or more relative location information messages indicating a subsequent location for the first UE based on relative information with respect to the first location.

Clause 20. The first UE of clause 19, wherein the relative information in each of the one or more relative location information messages comprises a difference in location coordinates between the first location of the first UE and a corresponding one of the one or more subsequent locations.

Clause 21. The first UE of clause 20, wherein the location coordinates comprise a latitude, a longitude, and an altitude.

Clause 22. The first UE of any of clauses 20-21, wherein the location coordinates comprise Cartesian coordinates.

Clause 23. The first UE of any of clauses 20-22, wherein the at least one processor is further configured to determine a configuration for the reference location information messages and relative location information messages, the configuration comprising one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages.

Clause 24. The first UE of clause 23, wherein the format indicates a granularity for reporting each of the location coordinates in the relative location information messages, wherein at least one of the location coordinates has a granularity differing from a granularity of another of the location coordinates.

Clause 25. The first UE of any of clauses 23-24, wherein the periodicity comprises a reference periodicity for transmitting the reference location information messages and a relative periodicity for transmitting the relative location information messages.

Clause 26. The first UE of clause 25, wherein the at least one processor is further configured to: transmit, based at least in part on the reference periodicity, a second reference location information message indicating the second location; determine, based at least in part on the relative periodicity, one or more subsequent locations of the first UE based on subsequent positioning measurements; and transmit, based at least in part on the relative periodicity, one or more second relative location information messages, each of the one or more relative location information messages indicating respective subsequent locations for the first UE with respect to the second location.

Clause 27. The first UE of any of clauses 23-26, wherein the configuration for the location information messages is determined at least in part based on one or more messages received from a network entity comprising a location management function (LMF), or a location server, or a second UE in the wireless network.

Clause 28. The first UE of clause 27, wherein the at least one processor is configured to determine the configuration by performing operations comprising receiving a message from the network entity specifying the configuration.

Clause 29. The first UE of any of clauses 27-28, wherein the at least one processor is configured to determine the configuration by performing operations comprising receiving one or more messages from the network entity indicating two or more supported configurations and selecting one of the two or more supported configurations.

Clause 30. The first UE of any of clauses 19-29, wherein each of the relative location information messages has a smaller payload size than each reference location information message.

Clause 31. The first UE of any of clauses 19-30, wherein the one or more relative location information messages are each transmitted via lower layer signaling.

Clause 32. The first UE of clause 31, wherein the one or more relative location information messages are included in media access control (MAC) control elements (MAC CE) or uplink control information (UCI).

Clause 33. The first UE of any of clauses 31-32, wherein the one or more relative location information messages are included in one or more sidelink control information (SCI) messages.

Clause 34. The first UE of clause 31, wherein the reference location information message is transmitted via lower layer signaling.

Clause 35. The first UE of clause 31, wherein the reference location information message is transmitted via higher layer signaling.

Clause 36. The first UE of clause 35, wherein the reference location information message is transmitted via a radio resource control (RRC) protocol or a Long Term Evolution (LTE) positioning protocol (LPP).

Clause 37. A method for supporting positioning of a first user equipment (UE) in a wireless network, performed by a location server in the wireless network, the method comprising: receiving a reference location information message from the first UE over a channel of a wireless network; determining a first reference location of the first UE based at least in part on the received reference location information message; receiving one or more relative location information messages from the first UE over the channel of the wireless network; and determining one or more relative locations of the first UE with respect to the first reference location based at least in part on relative information in the one or more relative location information messages.

Clause 38. The method of clause 37, wherein the relative information in each of the one or more relative location information messages comprises a difference in location coordinates between the first location of the first UE and a corresponding one of the one or more subsequent locations.

Clause 39. The method of clause 38, wherein the location coordinates comprise a latitude, a longitude, and an altitude.

Clause 40. The method of any of clauses 38-39, wherein the location coordinates comprise Cartesian coordinates.

Clause 41. The method of any of clauses 38-40, further comprising determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 42. The method of clause 41, wherein the format for the location information messages indicates a granularity for reporting each of the location coordinates in the relative location information messages, wherein at least one of the location coordinates has a granularity differing from a granularity of another of the location coordinates.

Clause 43. The method of any of clauses 41-42, wherein the periodicity comprises a reference periodicity for transmitting the reference location information messages and a relative periodicity for transmitting the relative location information messages.

Clause 44. The method of clause 43, further comprising: receiving, based at least in part on the reference periodicity, a second reference location information message; determining, based on the second reference location information message, a second reference location of the first UE; receiving, based at least in part on the relative periodicity, one or more second relative location information messages; and determining, based on relative information in the one or more second relative location information messages, one or more corresponding subsequent locations for the first UE with respect to the second location.

Clause 45. The method of any of clauses 41-44, further comprising transmitting one or more messages to the first UE specifying the configuration.

Clause 46. The method of any of clauses 41-45, further comprising transmitting one or more messages to the first UE indicating two or more supported configurations, wherein the determined configuration is one of the two or more supported configurations selected by the first UE.

Clause 47. The method of any of clauses 37-46, wherein each of the relative location information messages has a smaller payload size than each reference location information message.

Clause 48. The method of any of clauses 37-47, wherein the one or more relative location information messages are each transmitted via lower layer signaling.

Clause 49. The method of clause 48, wherein the one or more relative location information messages are included in media access control (MAC) control elements (MAC CE) or uplink control information (UCI).

Clause 50. The method of clause 48, wherein the one or more relative location information messages are included in one or more sidelink control information (SCI) messages.

Clause 51. The method of clause 48, wherein the reference location information message is transmitted via lower layer signaling.

Clause 52. The method of clause 48, wherein the reference location information message is transmitted via higher layer signaling.

Clause 53. The method of clause 52, wherein the reference location information message is transmitted via a radio resource control (RRC) protocol or a Long Term Evolution (LTE) positioning protocol (LPP).

Clause 54. A location server configured to support positioning of a first user equipment (UE) in a wireless network, comprising: an external interface configured to communicate with entities in the wireless network; at least one memory; at least one processor coupled to the external interface and the at least one memory, wherein the at least one processor is configured to: receive a reference location information message from the first UE over a channel of a wireless network; determine a first reference location of the first UE based at least in part on the received reference location information message; receive one or more relative location information messages from the first UE over the channel of the wireless network; and determine one or more relative locations of the first UE with respect to the first reference location based at least in part on relative information in the one or more relative location information messages.

Clause 55. The location server of clause 54, wherein the relative information in each of the one or more relative location information messages comprises a difference in location coordinates between the first location of the first UE and a corresponding one of the one or more subsequent locations.

Clause 56. The location server of clause 55, wherein the location coordinates comprise a latitude, a longitude, and an altitude.

Clause 57. The location server of any of clauses 55-56, wherein the location coordinates comprise Cartesian coordinates.

Clause 58. The location server of any of clauses 55-57, wherein the at least one processor is further configured to determine a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 59. The location server of clause 58, wherein the format for the location information messages indicates a granularity for reporting each of the location coordinates in the relative location information messages, wherein at least one of the location coordinates has a granularity differing from a granularity of another of the location coordinates.

Clause 60. The location server of any of clauses 58-59, wherein the periodicity comprises a reference periodicity for transmitting the reference location information messages and a relative periodicity for transmitting the relative location information messages.

Clause 61. The location server of clause 60, wherein the at least one processor is further configured to: receive, based at least in part on the reference periodicity, a second reference location information message; determine, based on the second reference location information message, a second reference location of the first UE; receive, based at least in part on the relative periodicity, one or more second relative location information messages; and determine, based on relative information in the one or more second relative location information messages, one or more corresponding subsequent locations for the UE with respect to the second location.

Clause 62. The location server of any of clause 58-61, wherein the at least one processor is further configured to transmit one or more messages to the first UE specifying the configuration.

Clause 63. The location server of any of clauses 58-62, wherein the at least one processor is further configured to transmit one or more messages to the first UE indicating two or more supported configurations, wherein the determined configuration is one of the two or more supported configurations selected by the first UE.

Clause 64. The location server of any of claims 54-63, wherein each of the relative location information messages has a smaller payload size than each reference location information message.

Clause 65. The location server of clause 54, wherein the one or more relative location information messages are each transmitted via lower layer signaling.

Clause 66. The location server of clause 65, wherein the one or more relative location information messages are included in media access control (MAC) control elements (MAC CE) or uplink control information (UCI).

Clause 67. The location server of clause 65, wherein the one or more relative location information messages are included in one or more sidelink control information (SCI) messages.

Clause 68. The location server of clause 65, wherein the reference location information message is transmitted via lower layer signaling.

Clause 69. The location server of clause 65, wherein the reference location information message is transmitted via higher layer signaling.

Clause 70. The location server of clause 69, wherein the reference location information message is transmitted via a radio resource control (RRC) protocol or a Long Term Evolution (LTE) positioning protocol (LPP).

Clause 71. A method for supporting positioning of a first user equipment (UE) in a wireless network by a serving base station for the first UE in the wireless network, the method comprising: receiving a reference location information message from the first UE over a channel of a wireless network; determining a first reference location of the first UE based at least in part on the received reference location information message; receiving one or more relative location information messages from the first UE over the channel of the wireless network; and determining one or more relative locations of the first UE with respect to the first reference location based at least in part on relative information in the one or more relative location information messages.

Clause 72. The method of clause 71, wherein the relative information in each of the one or more relative location information messages comprises a difference in location coordinates between the first location of the first UE and a corresponding one of the one or more subsequent locations.

Clause 73. The method of clause 72, wherein the location coordinates comprise a latitude, a longitude, and an altitude.

Clause 74. The method of any of clauses 72-73, wherein the location coordinates comprise Cartesian coordinates.

Clause 75. The method of any of clauses 72-74, further comprising determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 76. The method of clause 75, wherein the format for the location information messages indicates a granularity for reporting each of the location coordinates in the relative location information messages, wherein at least one of the location coordinates has a granularity differing from a granularity of another of the location coordinates.

Clause 77. The method of any of clauses 75-76, wherein the periodicity comprises a reference periodicity for transmitting the reference location information messages and a relative periodicity for transmitting the relative location information messages.

Clause 78, The method of clause 77, further comprising: receiving, based at least in part on the reference periodicity, a second reference location information message; determining, based on the second reference location information message, a second reference location of the first UE; receiving, based at least in part on the relative periodicity, one or more second relative location information messages; and determining, based on relative information in the one or more second relative location information messages, one or more corresponding subsequent locations for the UE with respect to the second location.

Clause 79. A base station configured to support positioning of a first user equipment (UE) in a wireless network, comprising: an external interface configured to wirelessly communicate with entities in the wireless network; at least one memory; at least one processor coupled to the external interface and the at least one memory, wherein the at least one processor is configured to: receiving a reference location information message from the first UE over a channel of a wireless network; determining a first reference location of the first UE based at least in part on the received reference location information message; receiving one or more relative location information messages from the first UE over the channel of the wireless network; and determining one or more relative locations of the first UE with respect to the first reference location based at least in part on relative information in the one or more relative location information messages.

Clause 80. The base station of clause 79, wherein the relative information in each of the one or more relative location information messages comprises a difference in location coordinates between the first location of the first UE and a corresponding one of the one or more subsequent locations.

Clause 81. The base station of clause 80, wherein the location coordinates comprise a latitude, a longitude, and an altitude.

Clause 82. The base station of any of clauses 80-81, wherein the location coordinates comprise Cartesian coordinates.

Clause 83. The base station of any of clauses 80-82, wherein the at least one processor is further configured to determine a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 84. The base station of clause 83, wherein the format for the location information messages indicates a granularity for reporting each of the location coordinates in the relative location information messages, wherein at least one of the location coordinates has a granularity differing from a granularity of another of the location coordinates.

Clause 85. The base station of any of clauses 83-84, wherein the periodicity comprises a reference periodicity for transmitting the reference location information messages and a relative periodicity for transmitting the relative location information messages.

Clause 86. The base station of clause 85, wherein the at least one processor is further configured to: receive, based at least in part on the reference periodicity, a second reference location information message; determine, based on the second reference location information message, a second reference location of the first UE; receive, based at least in part on the relative periodicity, one or more second relative location information messages; and determine, based on relative information in the one or more second relative location information messages, one or more corresponding subsequent locations for the first UE with respect to the second location.

Clause 87. A first user equipment (UE) configured to transmit location information messages in a wireless network, comprising: means for determining a first location of the first UE based on positioning measurements; means for transmitting a reference location information message indicating the first location; means for determining one or more subsequent locations of the first UE based on subsequent positioning measurements; and means for transmitting one or more relative location information messages, each of the one or more relative location information messages indicating a subsequent location for the first UE based on relative information with respect to the first location.

Clause 88. The first UE of clause 87, wherein the relative information in each of the one or more relative location information messages comprises a difference in location coordinates between the first location of the first UE and a corresponding one of the one or more subsequent locations.

Clause 89. The first UE of clause 88, wherein the location coordinates comprise a latitude, a longitude, and an altitude.

Clause 90. The first UE of any of clauses 88-89, wherein the location coordinates comprise Cartesian coordinates.

Clause 91. The first UE of any of clauses 88-90, further comprising means for determining a configuration for the reference location information messages and relative location information messages, the configuration comprising one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages.

Clause 92. The first UE of clause 91, wherein the format indicates a granularity for reporting each of the location coordinates in the relative location information messages, wherein at least one of the location coordinates has a granularity differing from a granularity of another of the location coordinates.

Clause 93. The first UE of any of clauses 91-92, wherein the periodicity comprises a reference periodicity for transmitting the reference location information messages and a relative periodicity for transmitting the relative location information messages.

Clause 94. The first UE of clause 93, further comprising: means for determining, based at least in part on the reference periodicity, a second location of the first UE based on positioning measurements; means for transmitting, based at least in part on the reference periodicity, a second reference location information message indicating the second location; means for determining, based at least in part on the relative periodicity, one or more subsequent locations of the first UE based on subsequent positioning measurements; and means for transmitting, based at least in part on the relative periodicity, one or more second relative location information messages, each of the one or more relative location information messages indicating respective subsequent locations for the first UE with respect to the second location.

Clause 95. The first UE of any of clauses 91-94, wherein the configuration for the location information messages is determined at least in part based on one or more messages received from a network entity comprising a location management function (LMF), or a location server, or a second UE in the wireless network.

Clause 96. The first UE of clause 95, wherein determining the configuration comprises receiving a message from the network entity specifying the configuration.

Clause 97. The first UE of any of clauses 95-96, wherein determining the configuration comprises receiving one or more messages from the network entity indicating two or more supported configurations and selecting one of the two or more supported configurations.

Clause 98. The first UE of any of clauses 87-97, wherein each of the relative location information messages has a smaller payload size than each reference location information message.

Clause 99. The first UE of any of clauses 87-98, wherein the one or more relative location information messages are each transmitted via lower layer signaling.

Clause 100. The first UE of clause 99, wherein the one or more relative location information messages are included in media access control (MAC) control elements (MAC CE) or uplink control information (UCI).

Clause 101. The first UE of clause 99, wherein the one or more relative location information messages are included in one or more sidelink control information (SCI) messages.

Clause 102. The first UE of clause 99, wherein the reference location information message is transmitted via lower layer signaling.

Clause 103. The first UE of clause 99, wherein the reference location information message is transmitted via higher layer signaling.

Clause 104. The first UE of clause 103, wherein the reference location information message is transmitted via a radio resource control (RRC) protocol or a Long Term Evolution (LTE) positioning protocol (LPP).

Clause 105. A location server configured to support positioning of a first user equipment (UE) in a wireless network, comprising: means for receiving a reference location information message from the first UE over a channel of a wireless network; means for determining a first reference location of the first UE based at least in part on the received reference location information message; means for receiving one or more relative location information messages from the first UE over the channel of the wireless network; and means for determining one or more relative locations of the first UE with respect to the first reference location based at least in part on relative information in the one or more relative location information messages.

Clause 106. The location server of clause 105, wherein the relative information in each of the one or more relative location information messages comprises a difference in location coordinates between the first location of the first UE and a corresponding one of the one or more subsequent locations.

Clause 107. The location server of clause 106, wherein the location coordinates comprise a latitude, a longitude, and an altitude.

Clause 108. The location server of any of clauses 106-107, wherein the location coordinates comprise Cartesian coordinates.

Clause 109. The location server of any of clauses 106-108, further comprising means for determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 110. The location server of clause 109, wherein the format for the location information messages indicates a granularity for reporting each of the location coordinates in the relative location information messages, wherein at least one of the location coordinates has a granularity differing from a granularity of another of the location coordinates.

Clause 111. The location server of any of clauses 109-110, wherein the periodicity comprises a reference periodicity for transmitting the reference location information messages and a relative periodicity for transmitting the relative location information messages.

Clause 112. The location server of clause 111, further comprising: means for receiving, based at least in part on the reference periodicity, a second reference location information message; means for determining, based on the second reference location information message, a second reference location of the first UE; means for receiving, based at least in part on the relative periodicity, one or more second relative location information messages; and means for determining, based on relative information in the one or more second relative location information messages, one or more corresponding subsequent locations for the first UE with respect to the second location.

Clause 113. The location server of any of clauses 109-112, further comprising means for transmitting one or more messages to the first UE specifying the configuration.

Clause 114. The location server of any of clauses 109-113, further comprising means for transmitting one or more messages to the first UE indicating two or more supported configurations, wherein the determined configuration is one of the two or more supported configurations selected by the first UE.

Clause 115. The location server of any of clauses 105-114, wherein each of the relative location information messages has a smaller payload size than each reference location information message.

Clause 116. The location server of any of clauses 105-115, wherein the one or more relative location information messages are each transmitted via lower layer signaling.

Clause 117. The location server of clause 116, wherein the one or more relative location information messages are included in media access control (MAC) control elements (MAC CE) or uplink control information (UCI).

Clause 118. The location server of clause 116, wherein the one or more relative location information messages are included in one or more sidelink control information (SCI) messages.

Clause 119. The location server of clause 116, wherein the reference location information message is transmitted via lower layer signaling.

Clause 120. The location server of clause 116, wherein the reference location information message is transmitted via higher layer signaling.

Clause 121. The location server of clause 120, wherein the reference location information message is transmitted via a radio resource control (RRC) protocol or a Long Term Evolution (LTE) positioning protocol (LPP).

Clause 122. A base station configured to support positioning of a user equipment (UE) in a wireless network, comprising: means for receiving a reference location information message from a first UE over a channel of a wireless network; means for determining a first reference location of the first UE based at least in part on the received reference location information message; means for receiving one or more relative location information messages from the first UE over the channel of the wireless network; and means for determining one or more relative locations of the first UE with respect to the first reference location based at least in part on relative information in the one or more relative location information messages.

Clause 123. The base station of clause 122, wherein the relative information in each of the one or more relative location information messages comprises a difference in location coordinates between the first location of the first UE and a corresponding one of the one or more subsequent locations.

Clause 124. The base station of clause 123, wherein the location coordinates comprise a latitude, a longitude, and an altitude.

Clause 125. The base station of any of clauses 123-124, wherein the location coordinates comprise Cartesian coordinates.

Clause 126. The base station of any of clauses 123-125, further comprising means for determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 127. The base station of clause 126, wherein the format for the location information messages indicates a granularity for reporting each of the location coordinates in the relative location information messages, wherein at least one of the location coordinates has a granularity differing from a granularity of another of the location coordinates.

Clause 128. The base station of any of clauses 126-127, wherein the periodicity comprises a reference periodicity for transmitting the reference location information messages and a relative periodicity for transmitting the relative location information messages.

Cause 129. The base station of clause 128, further comprising: means for receiving, based at least in part on the reference periodicity, a second reference location information message; means for determining, based on the second reference location information message, a second reference location of the first UE; means for receiving, based at least in part on the relative periodicity, one or more second relative location information messages; and means for determining, based on relative information in the one or more second relative location information messages, one or more corresponding subsequent locations for the first UE with respect to the second location.

Clause 130. A non-transitory computer readable storage medium storing instructions for execution by one or more processors of a first user equipment (UE) in a wireless network, wherein execution of the instructions causes the UE to perform operations comprising: determining a first location of the first UE based on positioning measurements; transmitting a reference location information message indicating the first location; determining one or more subsequent locations of the first UE based on subsequent positioning measurements; and transmitting one or more relative location information messages, each of the one or more relative location information messages indicating a subsequent location for the first UE based on relative information with respect to the first location.

Clause 131. The non-transitory computer readable storage medium of clause 130, wherein the relative information in each of the one or more relative location information messages comprises a difference in location coordinates between the first location of the first UE and a corresponding one of the one or more subsequent locations.

Clause 132. The non-transitory computer readable storage medium of clause 131, wherein the location coordinates comprise a latitude, a longitude, and an altitude.

Clause 133. The non-transitory computer readable storage medium of any of clauses 131-132, wherein the location coordinates comprise Cartesian coordinates.

Clause 134. The non-transitory computer readable storage medium of any of clauses 131-133, wherein execution of the instructions causes the first UE to perform operations further comprising determining a configuration for the reference location information messages and relative location information messages, the configuration comprising one or more of a format for the reference location information messages and relative location information messages, a periodicity for transmitting the reference location information messages and relative location information messages, and an indication of a reference-relative ratio, the reference-relative ratio indicating a first proportion of the reference location information messages and a second proportion of the relative location information messages.

Clause 135. The non-transitory computer readable storage medium of clause 134, wherein the format indicates a granularity for reporting each of the location coordinates in the relative location information messages, wherein at least one of the location coordinates has a granularity differing from a granularity of another of the location coordinates.

Clause 136. The non-transitory computer readable storage medium of any of clauses 134-135, wherein the periodicity comprises a reference periodicity for transmitting the reference location information messages and a relative periodicity for transmitting the relative location information messages.

Clause 137. The non-transitory computer readable storage medium of clause 136, wherein execution of the instructions causes the first UE to perform operations further comprising: determining, based at least in part on the reference periodicity, a second location of the first UE based on positioning measurements; transmitting, based at least in part on the reference periodicity, a second reference location information message indicating the second location; determining, based at least in part on the relative periodicity, one or more subsequent locations of the first UE based on subsequent positioning measurements; and transmitting, based at least in part on the relative periodicity, one or more second relative location information messages, each of the one or more relative location information messages indicating respective subsequent locations for the first UE with respect to the second location.

Clause 138. The non-transitory computer readable storage medium of any of clauses 134-137, wherein the configuration for the location information messages is determined at least in part based on one or more messages received from a network entity comprising a location management function (LMF), or a location server, or a second UE in the wireless network.

Clause 139. The non-transitory computer readable storage medium of clause 138, wherein determining the configuration comprises receiving a message from the network entity specifying the configuration.

Clause 140. The non-transitory computer readable storage medium of any of clauses 138-139, wherein determining the configuration comprises receiving one or more messages from the network entity indicating two or more supported configurations and selecting one of the two or more supported configurations.

Clause 141. The non-transitory computer readable storage medium of any of clauses 130-140, wherein each of the relative location information messages has a smaller payload size than each reference location information message.

Clause 142. The non-transitory computer readable storage medium of any of clauses 130-141, wherein the one or more relative location information messages are each transmitted via lower layer signaling.

Clause 143. The non-transitory computer readable storage medium of clause 142, wherein the one or more relative location information messages are included in media access control (MAC) control elements (MAC CE) or uplink control information (UCI).

Clause 144. The non-transitory computer readable storage medium of clause 142, wherein the one or more relative location information messages are included in one or more sidelink control information (SCI) messages.

Clause 145. The non-transitory computer readable storage medium of clause 142, wherein the reference location information message is transmitted via lower layer signaling.

Clause 146. The non-transitory computer readable storage medium of clause 142, wherein the reference location information message is transmitted via higher layer signaling.

Clause 147. The non-transitory computer readable storage medium of clause 146, wherein the reference location information message is transmitted via a radio resource control (RRC) protocol or a Long Term Evolution (LTE) positioning protocol (LPP).

Clause 148. A non-transitory computer readable storage medium storing instructions for execution by one or more processors of a location server, wherein execution of the instructions causes the location server to perform operations comprising: receiving a reference location information message from a first UE over a channel of a wireless network; determining a first reference location of the first UE based at least in part on the received reference location information message; receiving one or more relative location information messages from the first UE over the channel of the wireless network; and determining one or more relative locations of the first UE with respect to the first reference location based at least in part on relative information in the one or more relative location information messages.

Clause 149. The non-transitory computer readable storage medium of clause 148, wherein the relative information in each of the one or more relative location information messages comprises a difference in location coordinates between the first location of the first UE and a corresponding one of the one or more subsequent locations.

Clause 150. The non-transitory computer readable storage medium of clause 149, wherein the location coordinates comprise a latitude, a longitude, and an altitude.

Clause 151. The non-transitory computer readable storage medium of any of clauses 149-150, wherein the location coordinates comprise Cartesian coordinates.

Clause 152. The non-transitory computer readable storage medium of any of clauses 149-151, wherein execution of the instructions causes the location server to perform operations further comprising determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 153. The non-transitory computer readable storage medium of clause 152, wherein the format for the location information messages indicates a granularity for reporting each of the location coordinates in the relative location information messages, wherein at least one of the location coordinates has a granularity differing from a granularity of another of the location coordinates.

Clause 154. The non-transitory computer readable storage medium of any of clauses 152-153, wherein the periodicity comprises a reference periodicity for transmitting the reference location information messages and a relative periodicity for transmitting the relative location information messages.

Clause 155. The non-transitory computer readable storage medium of clause 154, wherein execution of the instructions causes the location server to perform operations further comprising: receiving, based at least in part on the reference periodicity, a second reference location information message; determining, based on the second reference location information message, a second reference location of the first UE; receiving, based at least in part on the relative periodicity, one or more second relative location information messages; and determining, based on relative information in the one or more second relative location information messages, one or more corresponding subsequent locations for the first UE with respect to the second location.

Clause 156. The non-transitory computer readable storage medium of any of clauses 152-155, wherein execution of the instructions causes the location server to perform operations further comprising transmitting one or more messages to the first UE specifying the configuration.

Clause 157. The non-transitory computer readable storage medium of any of clauses 152-156, wherein execution of the instructions causes the location server to perform operations further comprising transmitting one or more messages to the first UE indicating two or more supported configurations, wherein the determined configuration is one of the two or more supported configurations selected by the first UE.

Clause 158. The non-transitory computer readable storage medium of any of clauses 148-157, wherein each of the relative location information messages has a smaller payload size than each reference location information message.

Clause 159. The non-transitory computer readable storage medium of any of clauses 148-158, wherein the one or more relative location information messages are each transmitted via lower layer signaling.

Clause 160. The non-transitory computer readable storage medium of clause 159, wherein the one or more relative location information messages are included in media access control (MAC) control elements (MAC CE) or uplink control information (UCI).

Clause 161. The non-transitory computer readable storage medium of clause 159, wherein the one or more relative location information messages are included in one or more sidelink control information (SCI) messages.

Clause 162. The non-transitory computer readable storage medium of clause 159, wherein the reference location information message is transmitted via lower layer signaling.

Clause 163. The non-transitory computer readable storage medium of clause 159, wherein the reference location information message is transmitted via higher layer signaling.

Clause 164. The non-transitory computer readable storage medium of clause 163, wherein the reference location information message is transmitted via a radio resource control (RRC) protocol or a Long Term Evolution (LTE) positioning protocol (LPP).

Clause 165. A non-transitory computer readable storage medium storing instructions for execution by one or more processors of a base station, wherein execution of the instructions causes the base station to perform operations comprising: receiving a reference location information message from a first UE over a channel of a wireless network; determining a first reference location of the first UE based at least in part on the received reference location information message; receiving one or more relative location information messages from the first UE over the channel of the wireless network; and determining one or more relative locations of the first UE with respect to the first reference location based at least in part on relative information in the one or more relative location information messages.

Clause 166. The non-transitory computer readable storage medium of clause 165, wherein the relative information in each of the one or more relative location information messages comprises a difference in location coordinates between the first location of the first UE and a corresponding one of the one or more subsequent locations.

Clause 167. The non-transitory computer readable storage medium of clause 166, wherein the location coordinates comprise a latitude, a longitude, and an altitude.

Clause 168. The non-transitory computer readable storage medium of any of clauses 166-167, wherein the location coordinates comprise Cartesian coordinates.

Clause 169. The non-transitory computer readable storage medium of any of clauses 166-168, wherein execution of the instructions causes the base station to perform operations further comprising determining a configuration for the reference location information messages and the relative location information messages, the configuration comprising one or more of a format for the reference location information messages and the relative location information messages, a periodicity for transmitting the reference location information messages and the relative location information messages, and a reference-relative ratio, the reference-relative ratio indicating a first proportion of the reference location information messages and a second proportion of the relative location information messages.

Clause 170. The non-transitory computer readable storage medium of clause 169, wherein the format for the location information messages indicates a granularity for reporting each of the location coordinates in the relative location information messages, wherein at least one of the location coordinates has a granularity differing from a granularity of another of the location coordinates.

Clause 171. The non-transitory computer readable storage medium of any of clauses 169-170, wherein the periodicity comprises a reference periodicity for transmitting the reference location information messages and a relative periodicity for transmitting the relative location information messages.

Clause 172. The non-transitory computer readable storage medium of clause 171, wherein execution of the instructions causes the base station to perform operations further comprising: receiving, based at least in part on the reference periodicity, a second reference location information message; determining, based on the second reference location information message, a second reference location of the first UE; receiving, based at least in part on the relative periodicity, one or more second relative location information messages; and determining, based on relative information in the one or more second relative location information messages, one or more corresponding subsequent locations for the first UE with respect to the second location.

Therefore, it is intended that claimed subject matter not be limited to the particular examples disclosed, but that such claimed subject matter may also include all aspects falling within the scope of appended claims, and equivalents thereof.

What is claimed is:

1. A method for transmitting location information messages by a first user equipment (UE) in a wireless network, the method comprising:
    determining a first location of the first UE based on positioning measurements;
    transmitting a reference location information message indicating the first location;
    determining one or more subsequent locations of the first UE based on subsequent positioning measurements; and
    transmitting one or more relative location information messages, each of the one or more relative location information messages indicating a subsequent location for the first UE based on relative information with respect to the first location, wherein the relative information in each of the one or more relative location information messages comprises a difference in location coordinates between the first location of the first UE and a corresponding one of the one or more subsequent locations, and
    the method further comprising determining a configuration for the reference location information messages and relative location information messages, the configuration comprising one or more of: a format for the reference location information messages and relative location information messages, a periodicity for transmitting the reference location information messages and relative location information messages, an indication of a reference-relative ratio, the reference-relative ratio indicating a first proportion of the reference location information messages and a second proportion of the relative location information messages, or a combination thereof.

2. The method of claim 1, wherein the location coordinates comprise a latitude, a longitude, and an altitude.

3. The method of claim 1, wherein the location coordinates comprise Cartesian coordinates.

4. The method of claim 1, wherein the format indicates a granularity for reporting each of the location coordinates in the relative location information messages, wherein at least one of the location coordinates has a granularity differing from a granularity of another of the location coordinates.

5. The method of claim 1, wherein the periodicity comprises a reference periodicity for transmitting the reference location information messages and a relative periodicity for transmitting the relative location information messages.

6. The method of claim 5, further comprising:
    determining, based at least in part on the reference periodicity, a second location of the first UE based on positioning measurements;
    transmitting, based at least in part on the reference periodicity, a second reference location information message indicating the second location;
    determining, based at least in part on the relative periodicity, one or more subsequent locations of the first UE based on subsequent positioning measurements; and
    transmitting, based at least in part on the relative periodicity, one or more second relative location information messages, each of the one or more relative location information messages indicating respective subsequent locations for the first UE with respect to the second location.

7. The method of claim 1, wherein the configuration for the location information messages is determined at least in part based on one or more messages received from a network entity comprising a location management function (LMF), or a location server, or a second UE in the wireless network.

8. The method of claim 7, wherein determining the configuration comprises receiving a message from the network entity specifying the configuration.

9. The method of claim 7, wherein determining the configuration comprises receiving one or more messages from the network entity indicating two or more supported configurations and selecting one of the two or more supported configurations.

10. A first user equipment (UE) configured to transmit location information messages in a wireless network, comprising:
    a wireless transceiver configured to wirelessly communicate with entities in the wireless network;
    at least one memory;
    at least one processor coupled to the wireless transceiver and the at least one memory, wherein the at least one processor is configured to:
    determine a first location of the first UE based on positioning measurements;
    transmit a reference location information message indicating the first location;
    determine one or more subsequent locations of the first UE based on subsequent positioning measurements; and
    transmit one or more relative location information messages, each of the one or more relative location information messages indicating a subsequent location for the UE based on relative information with respect to the first location, wherein the relative information in each of the one or more relative location information messages comprises a difference in location coordinates between the first location of the first UE and a corresponding one of the one or more subsequent locations, and
    the at least one processor is further configured to determine a configuration for the reference location information messages and relative location information messages, the configuration comprising one or more of: a format for the reference location information messages and relative location information messages, a periodicity for transmitting the reference location information messages and relative location information messages, an indication of a reference-relative ratio, the reference-relative ratio indicating a first proportion of the reference location information messages and a second proportion of the relative location information messages, or a combination thereof.

11. The first UE of claim 10, wherein the location coordinates comprise a latitude, a longitude, and an altitude.

12. The first UE of claim 10, wherein the location coordinates comprise Cartesian coordinates.

13. The first UE of claim 10, wherein the format indicates a granularity for reporting each of the location coordinates in the relative location information messages, wherein at least one of the location coordinates has a granularity differing from a granularity of another of the location coordinates.

14. The first UE of claim 10, wherein the periodicity comprises a reference periodicity for transmitting the reference location information messages and a relative periodicity for transmitting the relative location information messages.

15. The first UE of claim 14, wherein the at least one processor is further configured to:
   transmit, based at least in part on the reference periodicity, a second reference location information message indicating the second location;
   determine, based at least in part on the relative periodicity, one or more subsequent locations of the first UE based on subsequent positioning measurements; and
   transmit, based at least in part on the relative periodicity, one or more second relative location information messages, each of the one or more relative location information messages indicating respective subsequent locations for the first UE with respect to the second location.

16. The first UE of claim 10, wherein the configuration for the location information messages is determined at least in part based on one or more messages received from a network entity comprising a location management function (LMF), or a location server, or a second UE in the wireless network.

17. The first UE of claim 16, wherein the at least one processor is configured to determine the configuration by performing operations comprising receiving a message from the network entity specifying the configuration.

18. The first UE of claim 16, wherein the at least one processor is configured to determine the configuration by performing operations comprising receiving one or more messages from the network entity indicating two or more supported configurations and selecting one of the two or more supported configurations.

19. A location server configured to support positioning of a first user equipment (UE) in a wireless network, comprising:
   an external interface configured to communicate with entities in the wireless network;
   at least one memory;
   at least one processor coupled to the external interface and the at least one memory, wherein the at least one processor is configured to:
      receive a reference location information message from the first UE over a channel of a wireless network;
      determine a first reference location of the first UE based at least in part on the received reference location information message;
      receive one or more relative location information messages from the first UE over the channel of the wireless network; and
      determine one or more relative locations of the first UE with respect to the first reference location based at least in part on relative information in the one or more relative location information messages, wherein the relative information in each of the one or more relative location information messages comprises a difference in location coordinates between the first location of the first UE and a corresponding one of the one or more subsequent locations, and
   the at least one processor is further configured to determine a configuration for the reference location information messages and the relative location information messages, the configuration comprising one or more of: a format for the reference location information messages and the relative location information messages, a periodicity for transmitting the reference location information messages and the relative location information messages, a reference-relative ratio, the reference-relative ratio indicating a first proportion of the reference location information messages and a second proportion of the relative location information messages, or
   a combination thereof.

20. The location server of claim 19, wherein the location coordinates comprise a latitude, a longitude, and an altitude.

21. The location server of claim 19, wherein the location coordinates comprise Cartesian coordinates.

22. The location server of claim 19, wherein the format for the location information messages indicates a granularity for reporting each of the location coordinates in the relative location information messages, wherein at least one of the location coordinates has a granularity differing from a granularity of another of the location coordinates.

23. The location server of claim 19, wherein the periodicity comprises a reference periodicity for transmitting the reference location information messages and a relative periodicity for transmitting the relative location information messages.

24. The location server of claim 23, wherein the at least one processor is further configured to:
   receive, based at least in part on the reference periodicity, a second reference location information message;
   determine, based on the second reference location information message, a second reference location of the first UE;
   receive, based at least in part on the relative periodicity, one or more second relative location information messages; and
   determine, based on relative information in the one or more second relative location information messages, one or more corresponding subsequent locations for the UE with respect to the second location.

25. The location server of claim 19, wherein the at least one processor is further configured to transmit one or more messages to the first UE specifying the configuration.

26. The location server of claim 19, wherein the at least one processor is further configured to transmit one or more messages to the first UE indicating two or more supported configurations, wherein the determined configuration is one of the two or more supported configurations selected by the first UE.

27. A base station configured to support positioning of a first user equipment (UE) in a wireless network, comprising:
   an external interface configured to wirelessly communicate with entities in the wireless network;
   at least one memory;
   at least one processor coupled to the external interface and the at least one memory, wherein the at least one processor is configured to:
      receiving a reference location information message from the first UE over a channel of a wireless network;
      determining a first reference location of the first UE based at least in part on the received reference location information message;
      receiving one or more relative location information messages from the first UE over the channel of the wireless network; and
      determining one or more relative locations of the first UE with respect to the first reference location based at least in part on relative information in the one or more relative location information messages, wherein the relative information in each of the one or more relative location information messages comprises a difference in location coordinates between the first location of the first UE and a corresponding one of the one or more subsequent locations, and wherein the at least one processor is further configured to determine a configuration for the reference location information messages and the relative location information messages, the configuration comprising one or more of: a format for the reference location information messages and the relative location information messages, a periodicity for transmitting the reference location information messages and the relative location information messages, a reference-relative ratio, the reference-relative ratio indicating a first proportion of the reference location information messages and a second proportion of the relative location information messages, or a combination thereof.

28. The base station of claim 27, wherein the location coordinates comprise a latitude, a longitude, and an altitude.

29. The base station of claim 27, wherein the location coordinates comprise Cartesian coordinates.

30. The base station of claim 27, wherein the format for the location information messages indicates a granularity for reporting each of the location coordinates in the relative location information messages, wherein at least one of the location coordinates has a granularity differing from a granularity of another of the location coordinates.

31. The base station of claim 27, wherein the periodicity comprises a reference periodicity for transmitting the reference location information messages and a relative periodicity for transmitting the relative location information messages.

32. The base station of claim 31, wherein the at least one processor is further configured to:
receive, based at least in part on the reference periodicity, a second reference location information message;
determine, based on the second reference location information message, a second reference location of the first UE;
receive, based at least in part on the relative periodicity, one or more second relative location information messages; and
determine, based on relative information in the one or more second relative location information messages, one or more corresponding subsequent locations for the UE with respect to the second location.

* * * * *